United States Patent

Tanaka et al.

[19]

[11] Patent Number: 5,905,495
[45] Date of Patent: May 18, 1999

[54] COMMUNICATION SYSTEM USING ELECTRONIC MAIL

[75] Inventors: Noriyuki Tanaka, Hadano; Keiko Takahara, Kawasaki; Kazuma Yumoto, Hachioji; Naoko Iwami, Machida; Tohru Hoshi, Yokohama; Toshiaki Koyama, Zama; Susumu Matsui, Machida, all of Japan

[73] Assignee: Hitachi, Ltd., Tokyo, Japan

[21] Appl. No.: 08/799,766

[22] Filed: Feb. 12, 1997

[30] Foreign Application Priority Data

Feb. 13, 1996 [JP] Japan .................................. 8-025412

[51] Int. Cl.⁶ .............................. G06F 7/00; G06F 15/16
[52] U.S. Cl. ......................... 345/335; 345/329; 345/331; 395/200.36
[58] Field of Search ..................................... 345/335, 329, 345/346, 347, 348, 356, 331; 395/439, 200.36

[56] References Cited

U.S. PATENT DOCUMENTS

| | | | |
|---|---|---|---|
| 4,817,018 | 3/1989 | Cree et al. | 345/331 |
| 5,125,075 | 6/1992 | Goodale et al. | 395/200.36 |
| 5,588,009 | 12/1996 | Will | 345/339 |
| 5,619,648 | 4/1997 | Canale et al. | 395/200.36 |

OTHER PUBLICATIONS

"Net.Speech: Desktop Audio Comes to the Net" Communications of the ACM, vol. 38, No. 10, Oct. 1995, pp. 25–31.

*Primary Examiner*—Raymond J. Bayerl
*Assistant Examiner*—Cao H. Nguyen
*Attorney, Agent, or Firm*—Antonelli, Terry, Stout & Kraus, LLP

[57] ABSTRACT

A communication system which can communicate with a party user even when an originator user of a communication terminal does not know the terminal address of a communication terminal of the party user with whom the originator user wants to communicate. When its own user A does not know the terminal address of a communication terminal of a user B, a communication terminal of the user A sends an outgoing file having its own terminal address stored therein as an electronic mail directed to the user B. When receiving the outgoing file as the electronic mail, the communication terminal of the user B displays an icon on its display unit to prompt the user B to enter an instruction of performing reply communication. In response to it, when the user B clicks a mouse on the icon, the communication terminal of the user B can perform the reply communication to the communication terminal corresponding to terminal address stored in the outgoing file.

4 Claims, 26 Drawing Sheets

FIG. 19

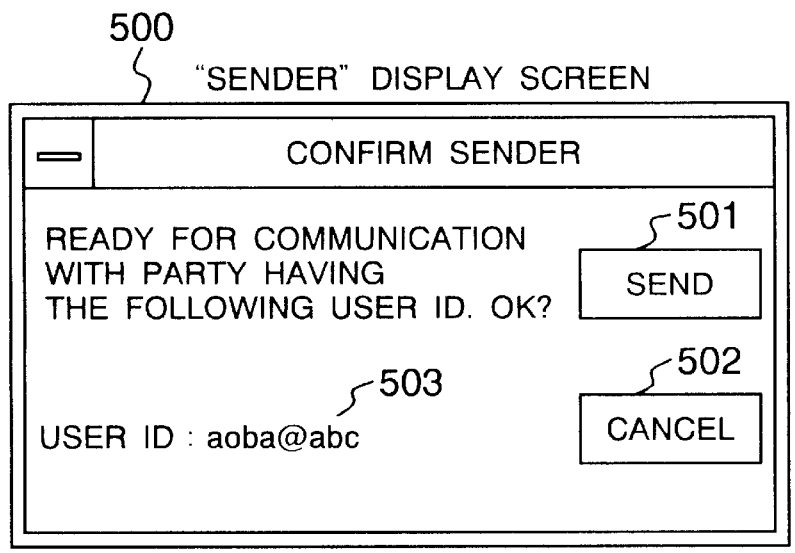

"SENDER" DISPLAY SCREEN 500

CONFIRM SENDER

READY FOR COMMUNICATION WITH PARTY HAVING THE FOLLOWING USER ID. OK?

SEND 501

CANCEL 502

USER ID : aoba@abc  503

FIG. 20

MAIL DESTINATION MANAGEMENT FILE

| USER ID 6310a | NAME 6310b | ORGANIZATION 6310c | DEPARTMENT 6310d |
|---|---|---|---|
| aoba@abc | ..ROU AOBA | A MOTORS CO. LTD | FIRST MARKETING DEPARTMENT, X BUSINESS OFFICE |
| tuzuki@xyz | ..KO TUZUKI | B ELECTRIC CO. LTD | DESIGN DEPARTMENT, THIRD GROUP |
| totsuka@pqr | ..O TOZUKA | C STEEL CO. LTD | GENERAL AFFAIRS DEPARTMENT, ACCOUNTING SECTION |
| ⋮ | ⋮ | ⋮ | ⋮ | ns
COMMUNICATION SYSTEM USING ELECTRONIC MAIL

BACKGROUND OF THE INVENTION

The present invention relates to a technique for enabling communication with a desired party user even when one of users at a plurality of communication terminals connected in a communication system does not know the terminal address of the communication terminal of the desired party user uniquely allocated thereto.

A communication system having communication terminals connected therein is generally designed so that one of users at the communication terminals can signal to or communicate with the communication terminal of a desired party user on the basis of a terminal address of the party user's communication terminal uniquely allocated thereto. Therefore, it is impossible for a caller to communicate with such a communication terminal that the caller does not know the party's terminal address.

In many of such communication systems, for the purpose of saving the number of terminal addresses as a limited resource, a terminal address is dynamically allocated to its communication terminal participating in the system when the communication terminal was connected to the system. For example, in the Internet, communication terminals being always connected via private line to the Internet are previously allocated their static terminal addresses (which are called "IP addresses" in the Internet), whereas communication terminals to be connected as necessary to the Internet via a public telephone line network (which connection is called "dial-up IP connection") are dynamically allocated their IP addresses when they are actually connected thereto.

In this way, in such a communication system that the communication terminal of a target party user is to be dynamically allocated its terminal address only when the terminal was connected; the communication terminal of the party user is not allocated when not connected to the system, while the party terminal address is being allocated thereto during the connection of the party terminal. However, the prior art communication system has had a problem that since the terminal address to be allocated varies each time its connection is carried out, it is difficult to communicate with such a party user communication terminal.

In order to facilitate communication between the users of the communication terminals, there has conventionally been suggested such a communication system that a monitor server for monitoring communication terminals being connected is provided, as disclosed in a journal entitled "COMMUNICATIONS OF THE ACM", an article entitled "Net. Speech: Desktop Audio Comes to the Net", Vol. 38, No. 10, October 1995.

In such a communication system as disclosed in the above literature, more specifically, a user sitting at one of the communication terminals, when he wants to connect its own terminal to the system, first declares its connection by informing the monitor server of his user name, in such a manner that the monitor server manages the user names informed by all the communication terminals of such users' who declared their connection as well as the terminal addresses allocated to the communication terminals. And the user of the communication terminal acquires a list of all user names under management of the monitor server. When the user informs the monitor server of the desired party user by selecting the desired user from the acquired user name list to specify the party user, this causes monitor server to call the communication terminal of the party user on the basis of the terminal address corresponding to the informed user name.

With such an arrangement as mentioned above, even when a user sitting at one of the communication terminals does not know the terminal address assigned to the communication terminal of the party user, he can communicate with the party user.

In such a communication system as disclosed in the above literature, however, the user of the communication terminal can call any one of the communication terminals being connected to the system through intervention of the monitor server, but to the contrary, may be called by all the communication terminals being connected thereto, which means that the caller communication terminal must also respond to the calls troublesomely by the communication terminals with which he does not want to communicate.

The above communication system is also disadvantageous in that the user of the caller communication terminal may be called by all the communication terminals even during communication with other communication terminal user, thus hindering its smooth communication.

Another disadvantage of the communication system is that the caller user of the communication terminal, when wanting to specify the user name of a desired party user from the user name list acquired from the monitor server, must troublesomely find the party user name from a lot of user names managed by the monitor server.

Yet another disadvantage of the system is that the caller communication terminal, which failed to inform the monitor server of its own party user name, cannot still be signaled by any other communication terminals so long as they does not know its terminal address, thus restricting the number of communicatable party users.

SUMMARY OF THE INVENTION

It is therefore an object of the present invention to provide a communication system which enables communication with a desired party user even when a caller user of a communication terminal does not know a terminal address of a communication terminal of the party user, while eliminating the need for provision of a monitor server.

In an aspect of the present invention, the above object is attained by providing a communication system in which a plurality of communication terminals connected and a mail server is connected therein for storing electronic mails transferred between the plurality of communication terminals.

Each of the plurality of communication terminals comprises:

(1) electronic mail means for transmitting the electronic mail directed to any user to the mail server and for receiving the electronic mail directed to its own user from the mail server;

(2) outgoing file preparation means for preparing an outgoing file including a terminal address uniquely allocated to its own communication terminal;

(3) outgoing file transmission means for sending the outgoing file prepared by the outgoing file preparation means to the electronic mail means as the electronic mail directed to a desired party user with whom its own user wants to communicate;

(4) reply communication acceptance/non-acceptance means, when the electronic mail received by the electronic mail means is the outgoing file, for accepting an instruction of whether its own communication terminal performs reply communication to the communication terminal corresponding to the terminal address included in the outgoing file; and (5) reply communication means, when the reply communication acceptance/non-acceptance means accepts an instruction of acceptance of the reply communication, for performing the reply communication to the communication terminal corresponding to the terminal address included in the outgoing file received by the electronic mail means as the electronic mail.

Accordingly, each communication terminal, when its own user does not know a terminal address allocated to the communication terminal of the party user with whom its own user wants to communicate, can send the outgoing file having the terminal address allocated thereto to the mail server as an electronic mail directed to the party user to thereby inform only the party user of its own terminal address and also to ask the party user the reply communication.

When the communication terminal which sent the outgoing file as the electronic mail directed to the party user has such a terminal address as to be dynamically allocated at the time of its connection, termination of the connection may disadvantageously cause not only the originator communication terminal to be put in a state where its terminal address is not allocated but also the terminal address so far allocated to be allocated to the other communication terminal later connected to the system. For this reason, at the time that the communication terminal of the party user performs the reply communication to the communication terminal having the terminal address included in the outgoing file received as the electronic mail, if the connection of the communication terminal of the user (reply communication asker) who sent the electronic mail is already completed, then the communication terminal of the party user may fail to find the corresponding right communication terminal or the reply communication may be received by the other communication terminal of a user different from the reply communication asker.

For the purpose of beforehand preventing the unnecessary reply communication to the other wrong communication terminal of a user other than the reply communication asker, in accordance with the present invention, each communication terminal comprises response limit input means for accepting an input of a response limit indicative of an acceptance limit of the incoming signal based on the reply communication. In this case, the outgoing file preparation means prepares the outgoing file which further includes the response limit accepted by the response limit input means, and the reply communication means performs no operation when the current time exceeds the response limit included in the outgoing file received as the electronic mail by the electronic mail means.

Accordingly, each communication terminal can send the outgoing file further including the response limit to the mail server as the electronic mail directed to the party user to thereby ask the party user to perform the reply communication, accommodating the inconvenient dynamic address allocation of the communication terminal of the reply communication asker.

Further, for the purpose of beforehand preventing the unnecessary reply communication to the communication terminal of the user other than the reply communication asker, in accordance with the present invention, the outgoing file preparation means prepares the outgoing file which further includes certification information for certifying its own user, and the reply communication means, when performing the reply communication to the communication terminal corresponding to the terminal address included in the outgoing file received as the electronic mail by the electronic mail means, sends the certification information included in the outgoing file to the communication terminal of the communication destination. In this case, each of the plurality of communication terminals further comprises selective response means, when receiving the incoming signal from the other communication terminal and at the same time the certification information and when the certification information is the correct certification information, for accepting the incoming signal.

Therefore, when each communication terminal receives the incoming signal from the other communication terminal and at the same time the certification information, this means that the incoming signal is based on the reply communication. In this case, only when the certification information simultaneously received is the correct certification information, the originator communication terminal accepts the incoming signal, whereby the originator communication terminal can accept only the incoming signal based on the reply communication received from the party communication terminal.

In particular, when the certification information further included in the outgoing file prepared by the outgoing file preparation means is the user ID of its own user as the address of the electronic mail addressed to its own user, each communication terminal comprises user ID memory means for storing user IDs of a plurality of users therein. When the user ID memory means stores therein the user ID included in the outgoing file received as the electronic mail by the electronic mail means, the reply communication acceptance/non-acceptance means performs no operation. When the user ID memory means stores therein the user ID included in the outgoing file received as the electronic mail by the electronic mail means, the reply communication means performs the reply communication to the communication terminal having the terminal address included in the outgoing file.

When the user who is asked the reply communication by receiving the outgoing file as the electronic mail knows the user ID (user ID of the reply communication asker) included in the outgoing file as the certification information, this means that the both users are probably familiar to each other. In this case, each communication terminal may perform the reply communication if necessary without any need for accepting an instruction of whether to perform the reply communication by its own user.

In accordance with the present invention, for the purpose of providing easy operation of the reply communication requestee or askee entering the instruction of whether to perform the reply communication, the reply communication acceptance/non-acceptance means can cause appearance of the terminal address included in the outgoing file received as the electronic mail by the electronic mail means on the display screen and also cause appearance of an icon on the display screen to prompt its own user to enter an instruction of performing the reply communication to the communication terminal corresponding to the terminal address.

Further, in particular, even when the certification information further included in the outgoing file prepared by the outgoing file preparation means is the user ID of its own user as the address of the electronic mail directed to its own user, the reply communication acceptance/non-acceptance means similarly cause appearance of the user ID included in the outgoing file received as the electronic mail by the electronic mail means on the display screen and also cause appearance of the icon on the display screen to prompt its own user to enter an instruction of performing the reply communication to the communication terminal of the user corresponding to the user ID.

Accordingly, each communication terminal can activate the reply communication means only by clicking the mouse on the icon displayed on the display screen by the reply communication askee.

Furthermore, each communication terminal, if necessary, may comprise user information memory means for storing therein each plurality of user IDs and user information including user names of users of each plurality of user IDs in association therewith. In this case, when the user information memory means stores therein the user information corresponding to the user ID to be displayed on the display screen, the reply communication acceptance/non-acceptance means causes additional appearance of the user information on the display screen, whereby the user who is asked the reply communication can know the user information of the reply communication asker.

BRIEF DESCRIPTION OF THE DRAWINGS

The above and other objects, features and advantages of the present invention will become apparent from the following detailed description when taken with the accompanying drawings in which;

FIG. 19 is a diagram showing an example of a "Sender" display screen;

FIG. 20 is a diagram showing an exemplary structure of a mail address management file;

DESCRIPTION OF THE PREFERRED EMBODIMENTS

Embodiments of the present invention will be explained with reference to the accompanying drawings.

Figure 1:
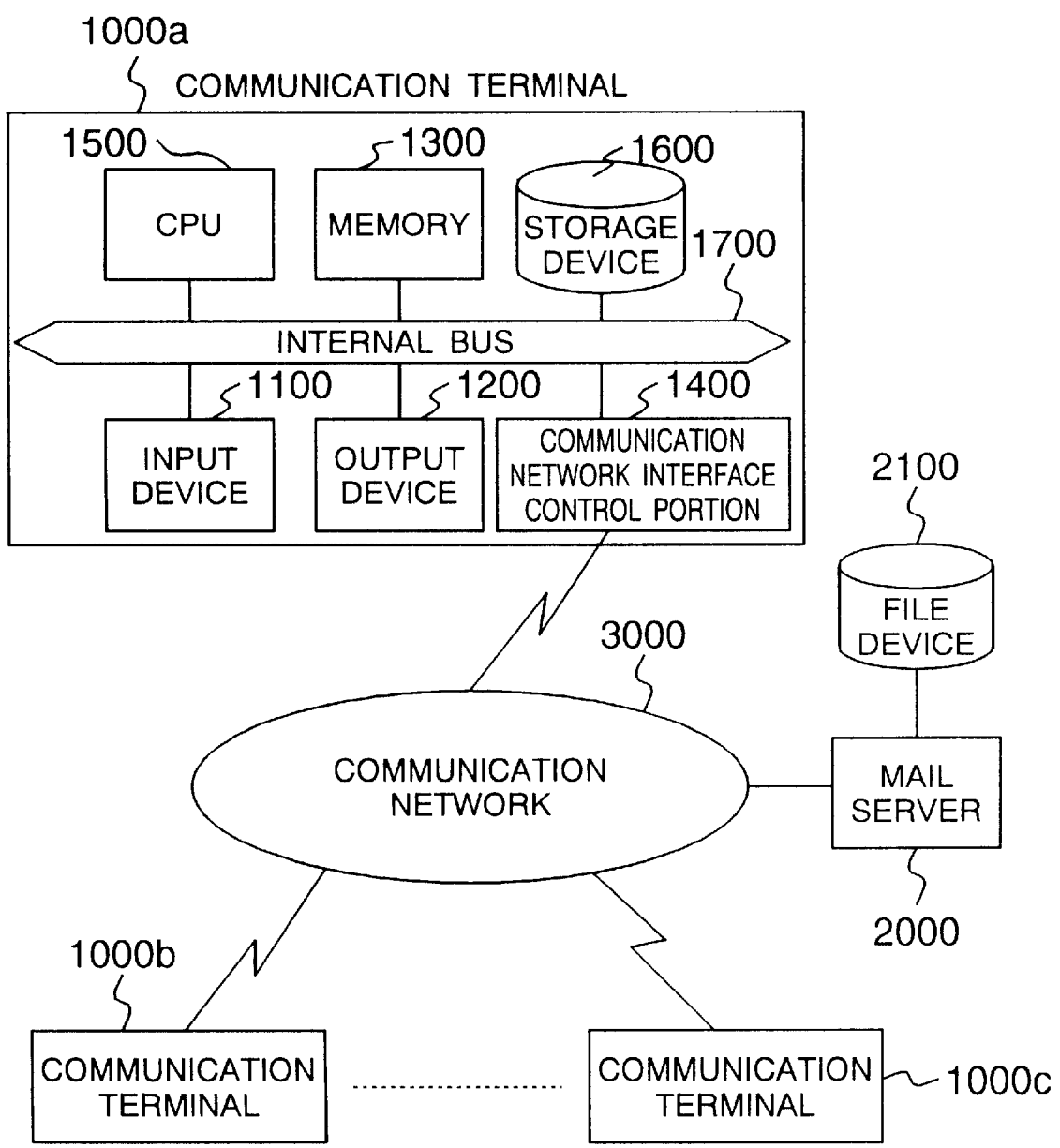
FIG. 1 is an arrangement of a network to which a communication system in accordance with the present invention is applied.

Referring first to FIG. 1, there is shown an arrangement of a network to which a communication system of the present invention is applied. In the drawing, reference symbols 1000a to 1000c denote communication terminals, numeral 2000 denotes a mail server, 2100 denotes a file device for storing electronic mails therein, and 3000 denotes a communication network.

The communication terminal 1000a, as shown in FIG. 1, comprises an input device 1100 for receiving various types of information such as audio, video and data, an output device 1200 for issuing various types of information such as audio, video and data, a communication network interface control portion 1400 for performing interface operation with the communication network 3000, a CPU 1500, a storage device 1600 for storing therein various information including individual address note data set by a user, and an internal bus 1700. The operation of the communication terminal 1000a is implemented by means of the CPU 1500 reading out various application software or programs from a memory 1300 to execute them.

The other communication terminals 1000b and 1000c have the same structure as the communication terminal 1000a.

The communication system of the present invention is designed so that, by connecting the mail server 2000 to the communication network 3000, the user of the communication terminal 1000 (1000a, 1000b or 1000c) can send to the mail server 2000 an electronic mail addressed to a given user and can receive an electronic mail directed to his own from the mail server 2000. And when the communication terminal 1000 fails to know the terminal address of the party communication terminal 1000 with which the sender wishes to communicate, the communication terminal 1000 of the party user sends an outgoing file including its own terminal address as an electronic mail directed to the party user to ask the party to send back from the communication terminal 1000 of the party user, whereby, only when the party user admits its reply communication, the both users can communicate with each other.

That is, in the party communication terminal 1000, when the electronic mail directed to its own user and received from the mail server 2000 is the outgoing file, this means that the user who sent the outgoing file as the electronic mail is asking the receiver to admit the reply communication. Therefore, when the receiver user admits the reply communication, the party communication terminal can perform the reply communication to the communication terminal (that is, whose user asked to admit the reply communication) indicative of the terminal address contained in the outgoing file.

Figure 2:
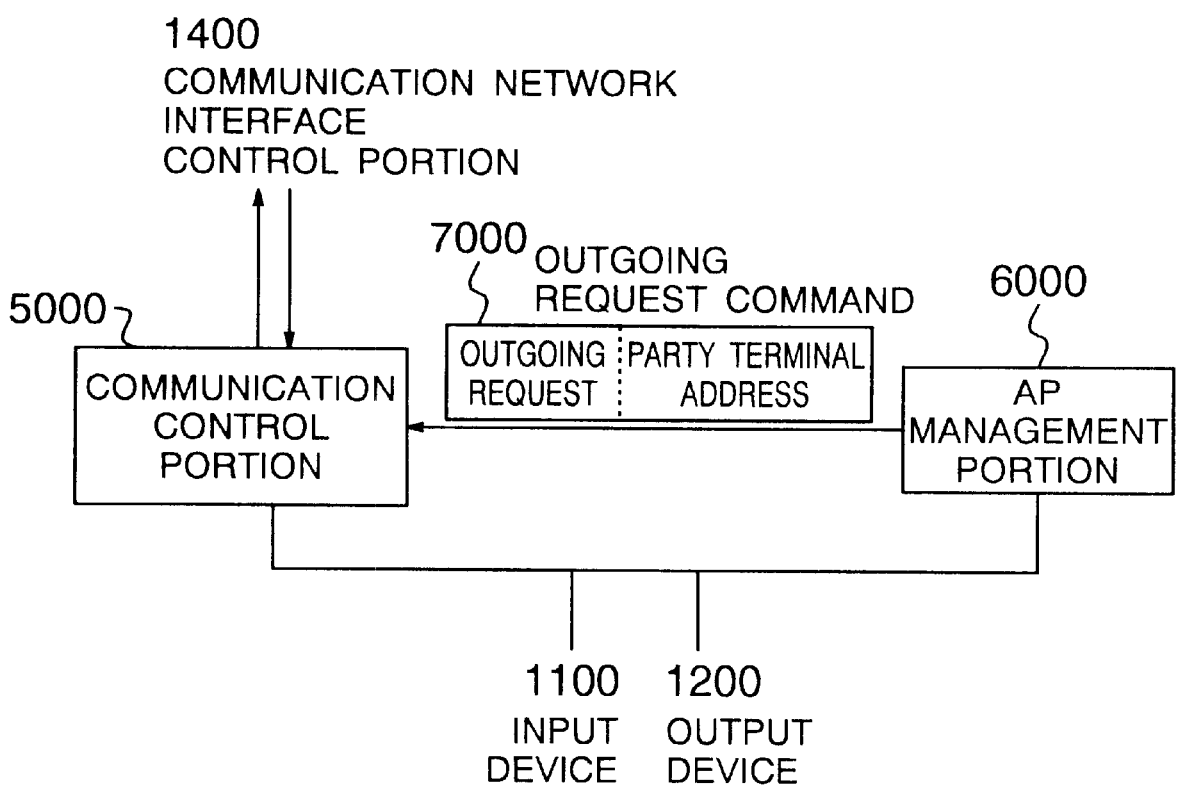
FIG. 2 is a functional block diagram of a communication terminal.

Explanation will be made as to a communication system in accordance with a first embodiment of the present invention. Shown in FIG. 2 is a functional block diagram of the communication terminal 1000. In the drawing, numeral 5000 denotes a communication control portion, 6000 denotes an AP management portion, 7000 denotes an outgoing request command.

The communication control portion 5000 controls the communication network interface control portion 1400 to establish a communication channel between the other communication terminal 1000 and the mail server 2000, according to the contents of an instruction entered by its own user through the input device 1100 or the contents of a request issued from the AP management portion 6000.

The communication control portion 5000, after the communication network interface control portion 1400 establishes the communication channel with the other communication terminal 1000, can transmit and receive various types of information such as audio, video or data to and from the other communication terminal 1000 via the communication network interface control portion 1400. When the communication network interface control portion 1400 establishes the communication channel with the mail server 2000, the communication terminal 1000 in question sends to the mail server 2000 an electronic mail addressed to a user via the communication network interface control portion 1400 and receives from the mail server 2000 an electronic mail directed to its own user.

Meanwhile, the AP management portion 6000 activates various types of application programs for processing of documents or spreadsheets and outputs its processed results (e.g., character data or chart data) to the output device 1200.

In particular, when the contents of an instruction entered by its own user from the input device 1100 indicates sending to the other communication terminal 1000, the AP management portion 6000 of its own user already knows the terminal address (party terminal address) of the other communication terminal 1000 as its send destination. Thus, when identifying the party terminal address, the AP management portion 6000 outputs to the communication control portion 5000 a request indicative of sending to the other communication terminal 1000.

When the contents of an instruction entered by its own user from the input device 1100 does not indicate sending to the other communication terminal 1000, the AP management portion 6000 of its own user does not know the terminal address (party terminal address) of the other communication terminal 1000 as its send destination. Thus, when not identifying the party terminal address, the AP management portion 6000 prepares an outgoing file containing the terminal address (its own or my terminal address) of the communication terminal 1000.

The outgoing file prepared by the AP management portion 6000 is sent from the communication control portion 5000 to the mail server 2000 as an electronic mail addressed to a desired party user.

When the electronic mail directed to its own user and received through the communication network interface control portion 1400 indicates the outgoing file and the communication control portion 5000 of its own user admits the reply communication, an instruction to perform the reply communication can be entered from the input device 1100. Thus, when the contents of the instruction entered by the its own user from the input device 1100 indicates performing the reply communication, the outgoing file received as the electronic mail has the party terminal address (the terminal address of the communication terminal 1000 which user sent the electronic mail) of the communication terminal 1000 as the reply communication originator already set therein and the party terminal address is identified, so that the AP management portion 6000 outputs a request to communicate with the other communication terminal 1000 to the communication control portion 5000.

In FIG. 2, when the AP management portion 6000 outputs the request of communicating with the other communication terminal 1000 to the communication control portion 5000, the outgoing request command 7000 is issued from the AP management portion 6000 to the communication control portion 5000. The outgoing request command 7000 has an identifier indicative of an outgoing request as well as the party terminal address of the communication terminal 1000 as its communication destination already set therein.

Figure 3:
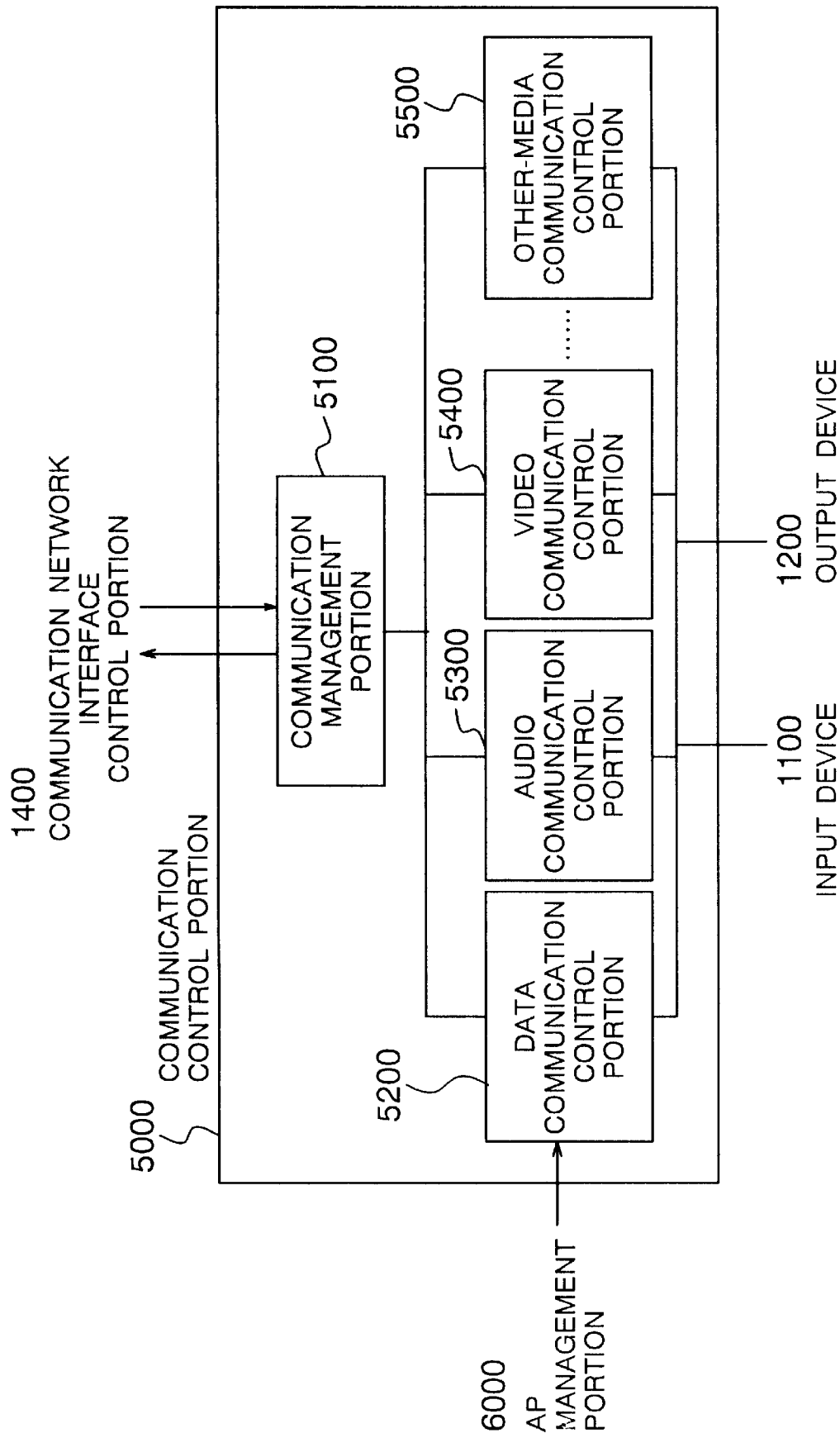
FIG. 3 is a functional block diagram of details of a communication control portion.

FIG. 3 shows a functional block diagram of details of the communication control portion 5000. In the drawing, numeral 5100 denotes a communication management portion, 5200 denotes a data communication control portion, 5300 denotes a audio communication control portion, 5400 denotes a video communication control portion, and 5500 denotes an other-media communication control portion.

The communication management portion 5100 functions to control the data communication control portion 5200, audio communication control portion 5300, video communication control portion 5400 and other-media communication control portion 5500 for communication management of various media such as simultaneous communication of various media or change-over therebetween. That is, the communication management portion 5100 receives and sends various data such as audio, video and data from and to the communication network interface control portion 1400.

The data communication control portion 5200 performs communication control over a data-associated system, the audio communication control portion 5300 performs communication control over an audio-associated system, the video communication control portion 5400 performs communication control over a video-associated system, and the other-media communication control portion 5500 performs communication control over other media such as an electron mail system or a FAX system.

The outgoing file prepared by the AP management portion 6000 is sent from the other-media communication control portion 5500 to the mail server 2000 as an electronic mail addressed to a party user with whom its own user desired to communicate.

In the communication control portion 5000, the outgoing request command 7000 issued from the AP management portion 6000 is accepted by the data communication control portion 5200. Explanation will now be made as to the data communication control portion 5200.

Figure 4:
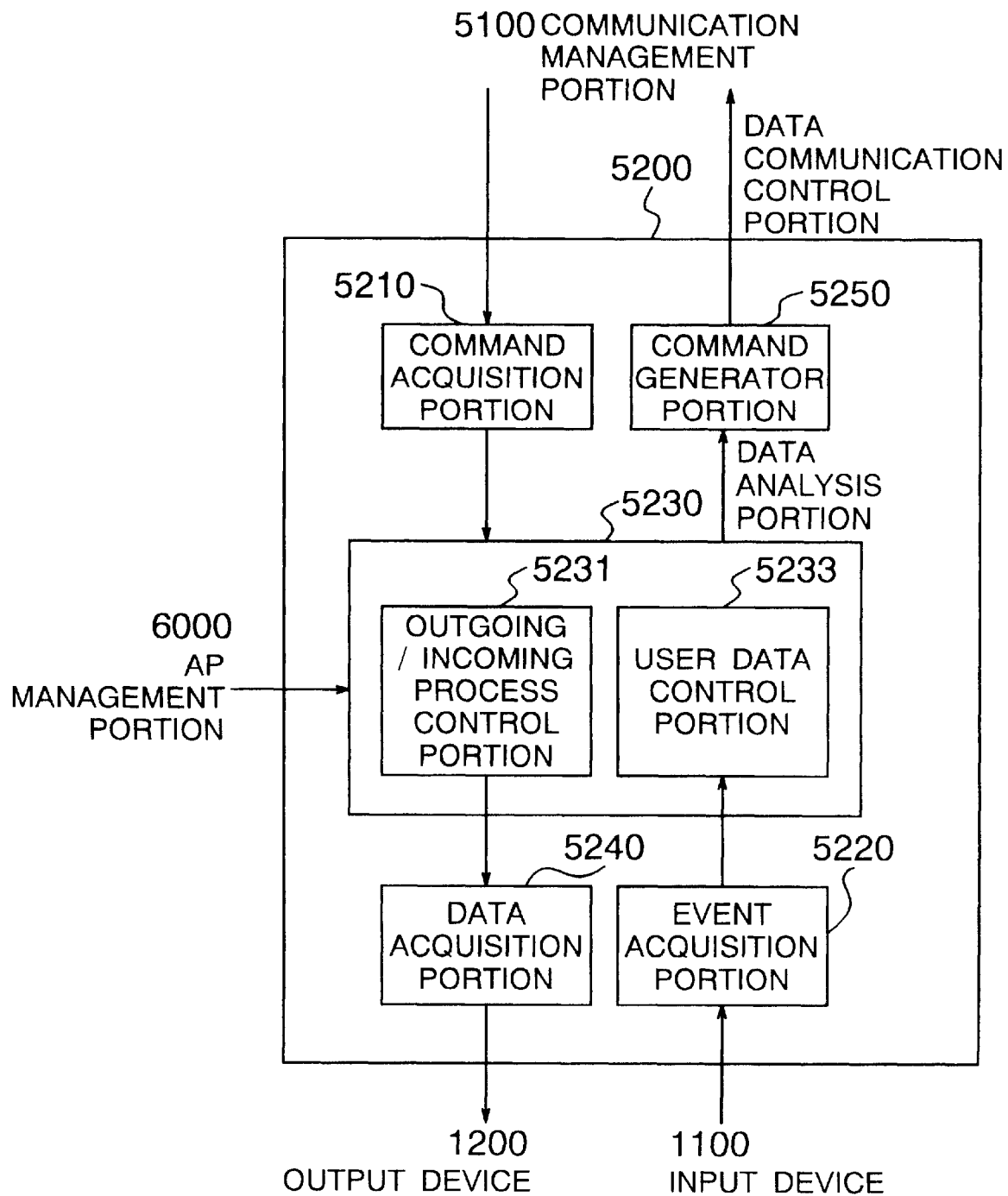
FIG. 4 is a functional block diagram of details of a data communication control portion.

The data communication control portion 5200 is shown by its detailed functional block diagram in FIG. 4. In the drawing, 5210 denotes a command acquisition portion, 5220 denotes an event acquisition portion, 5230 denotes a data analysis portion, 5240 denotes a data acquisition portion, and 5250 denotes a command generator portion.

The command acquisition portion 5210 gets a command or data transmitted from the communication terminal 1000 of the communication party through the communication management portion 5100, while the event acquisition portion 5220 gets an event or data received from the input device 1100 by the user of the communication terminal 1000.

The data analysis portion 5230 analyzes a command received from the command acquisition portion 5210 or an even received from the event acquisition portion 5220, determines processing to be carried out and executes the determined processing. The data analysis portion 5230 has an outgoing/incoming process control portion 5231 for controlling start and end of communication with the other communication terminal 1000 and a user data control portion 5233 for controllably performing transfer of given-user data with the other communication terminal 1000.

The data acquisition portion 5240 acquires from the data analysis portion 5230 data to be informed to the user of the communication terminal 1000, and outputs the acquired data to the output device 1200. The data acquisition portion 5240 converts the acquired data to a suitable display format of data, and then outputs it to the output device 1200.

The command generator portion 5250 gets, from the data analysis portion 5230, data to be informed to the audio communication control portion 5300, video communication control portion 5400 and other-media communication control portion 5500 or data to be informed to the communication terminal 1000 of the communication party, and generates a command indicative of the contents of the acquired data.

In the data communication control portion 5200, the outgoing request command 7000 issued from the AP management portion 6000 is accepted by the outgoing/incoming process control portion 5231, which will be explained later.

Figure 5:
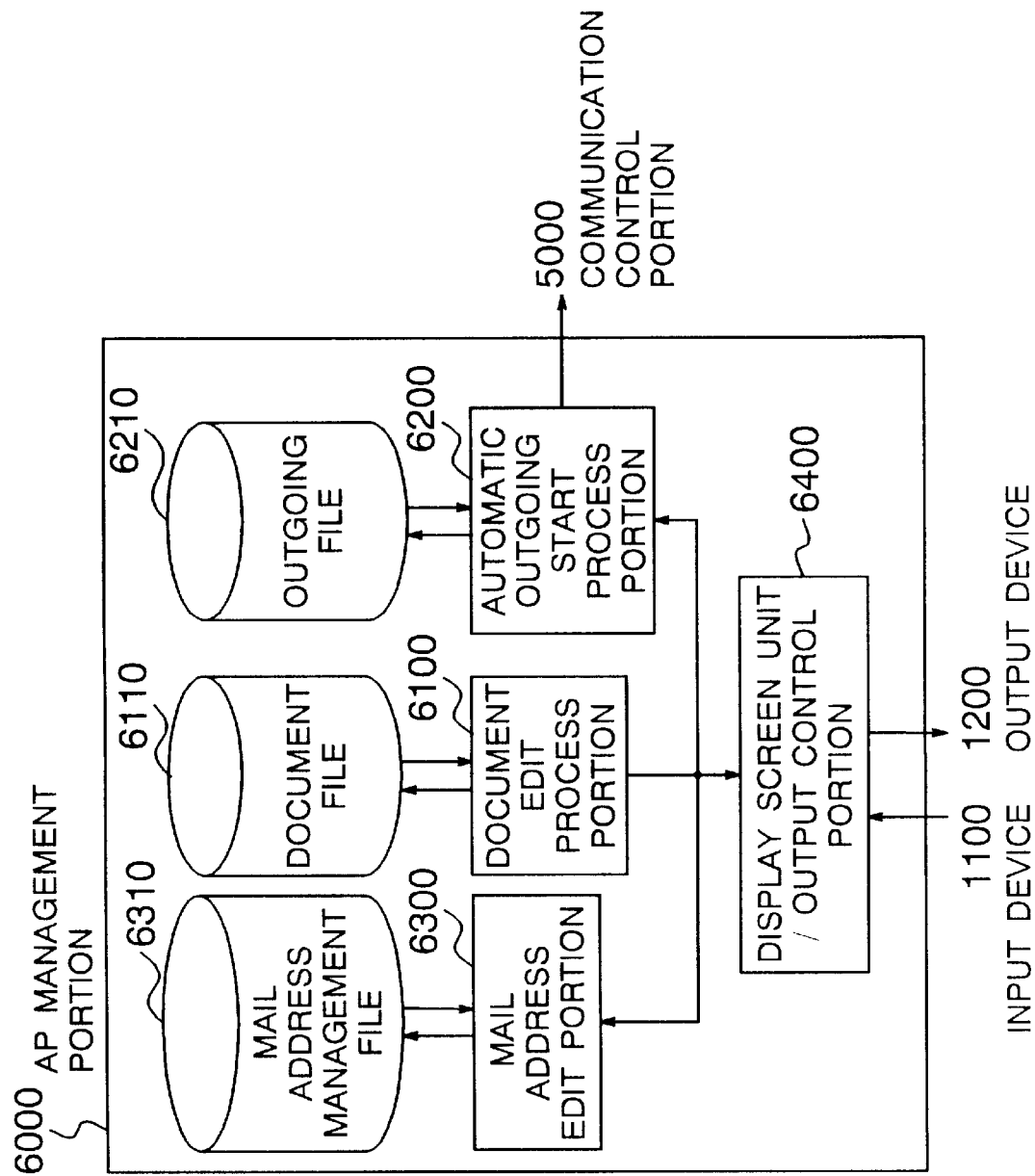
FIG. 5 is a functional block diagram of details of an AP (application program) management portion.

FIG. 5 shows a functional block diagram of details of the AP management portion 6000. In the drawing, 6110 denotes a document file, 6document media document edit process portion, 6210 denotes an outgoing file, 6200 denotes an automatic outgoing start process portion, 6310 denotes a mail address management file, 6300 denotes a mail address edit portion, and 6400 denotes a display screen input/output control portion.

The document file 6110 is a file having various types of data such as character or chart data stored therein; the outgoing file 6210 is a file having the terminal address (my address) of the communication terminal 1000 or the terminal address (party terminal address) of the other communication terminal 1000 as the communication destination stored therein; and the mail address management file 6310 is a file having at least one set of address information each including destination information of a user ID as an electronic mail destination and of user's name and department, stored therein. These document file 6110, outgoing file 6210 and mail address management file 6310 are stored in the storage device 1600.

The document edit process portion 6100 reads out the document file 6110 specified by its own user from the storage device 1600, outputs to the display screen input/output control portion 6400 a request of outputting the contents of the read-out document file 6110 to the output device 1200, or in accordance with a request issued from the display screen input/output control portion 6400, edits the contents of the document file 6110 read out from the storage device 1600.

The automatic outgoing start process portion 6200 prepares the outgoing file 6210 having the my address of the communication terminal 1000 stored therein to store it in the storage device 1600, reads out from the storage device 1600 the outgoing file 6210 specified by its own user, and prepares the outgoing request command 7000 having the party terminal address stored in the read-out outgoing file 6210 set therein, and then issues it to the communication control portion 5000.

The mail address edit portion 6300 reads out from the storage device 1600 the mail address management file 6310 specified by its own user, outputs to the display screen input/output control portion 6400 a request of outputting the contents of the read-out mail address management file 6310 to the output device 1200, or in accordance with a request issued from the display screen input/output control portion 6400, edits the contents of the mail address management file 6310 read out from the storage device 1600.

The AP management portion 6000, in addition to the document edit process portion 6100, automatic outgoing start process portion 6200 and mail address edit portion 6300, includes, for example, various process portions including an electronic mail outgoing/incoming process portion for sending/receiving electronic mails, though not illustrated.

In accordance with the contents of a request issued from various process portions including the document edit process portion 6100, automatic outgoing start process portion 6200 and mail address edit portion 6300, the display screen input/output control portion 6400 converts various types of information to be output to the output device 1200 into suitable display formats, or outputs a request entered by its own user from the input device 1100 to various process portions including the document edit process portion 6100, automatic outgoing start process portion 6200 and mail address edit portion 6300.

Figure 6:
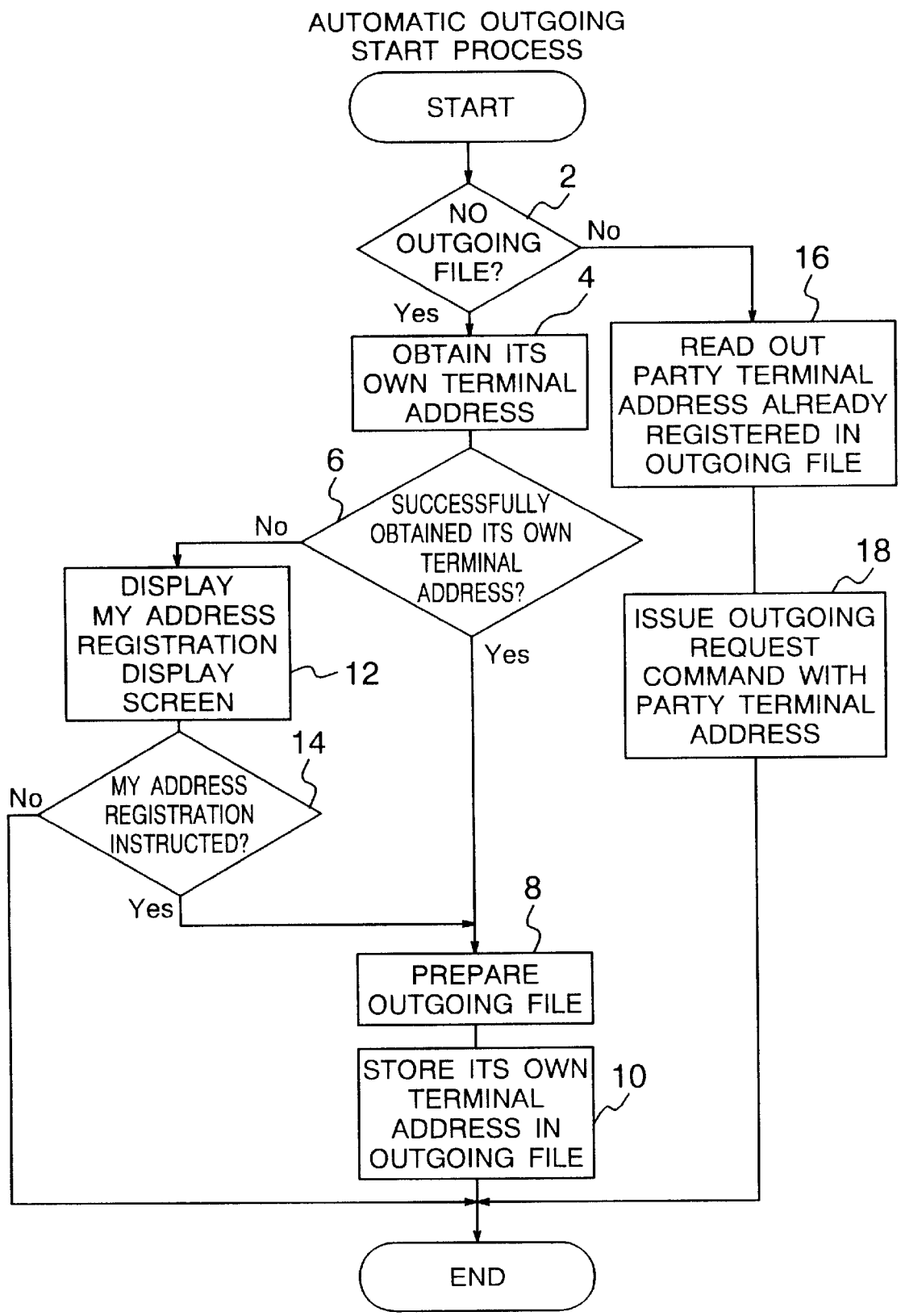
FIG. 6 is a flowchart for explaining an automatic outgoing start process carried out by an automatic outgoing start process portion.

There is shown in FIG. 6 a flowchart for explaining automatic outgoing start operation carried out by the automatic outgoing start process portion 6200. The automatic outgoing start process is activated when the contents of the instruction entered by its own user from the input device 1100 indicates communicating with the other communication terminal 1000 or when it indicates performing the reply communication with the other communication terminal 1000.

As shown in FIG. 6, the automatic outgoing start process portion 6200 first judges whether or not the automatic outgoing start process was activated as associated with the specification of any outgoing file 6210 (at a step 2).

In the case where the contents of the instruction entered by its own user from the input device 1100 indicates communicating with the other communication terminal 1000, if the own user knows the party address of the communication terminal 1000 as the communication destination, then the outgoing file 6210 having the party terminal address stored therein can be specified, which means that the automatic outgoing start process can be started as associated with the specification of any outgoing file 6210. In the case where the contents of the instruction entered by its own user from the input device 1100 indicates performing the reply communication with the other communication terminal 1000, this means that the outgoing file 6210 including the party terminal address (with respect to the communication terminal 1000 which user sent the electronic mail, its own terminal address) of the communication terminal 1000 as the reply communication destination is already received as an electronic mail and thus the outgoing file 6210 can be identified, with the result that the automatic outgoing start process is activated as associated with the specification of any outgoing file 6210.

Therefore, the automatic outgoing start process portion 6200 reads out the terminal address (party terminal address) stored in the associated outgoing file 6210 at the time of starting the automatic outgoing start process (step 16), prepares the outgoing request command 7000 having the read-out party terminal address set therein and issues it to the communication control portion 5000 (step 18).

As a result, the outgoing process carried by the outgoing/incoming process control portion 5231 of the communication control portion 5000 causes communication or reply communication with the communication terminal 1000 indicative of the party terminal address.

Meanwhile, in the case where the contents of an instruction entered by its own user from the input device 1100 indicates communicating with the other communication terminal 1000, if the own user does not know the party terminal address of the communication terminal 1000 as the communication destination, then the communication system cannot identify the outgoing file 6210 having the party terminal address stored therein, whereby the automatic outgoing start process is started without being associated with the specification of any outgoing file 6210.

At this time, the automatic outgoing start process portion 6200 acquires my address assigned to the communication terminal 1000 when the automatic outgoing start process is started (step 4). When successfully acquiring my address (step 6), the automatic outgoing start process portion 6200 prepares the outgoing file 6210 (step 8), stores the acquired my address in the prepared outgoing file 6210, and then stores the file in the storage device 1600 (step 10).

There may be considered to occur in some communication terminal 1000 such a situation where its automatic outgoing start process portion 6200 cannot acquire its own address and its own user must activate such a program as to allow acquisition and examination of its own terminal address. When the communication terminal 1000 fails to get its own terminal address (step 6), the automatic outgoing start process proceeds to a step 12 to prompt its own user to enter its own terminal address to be stored in the outgoing file 6210.

That is, in the step 12, a "My Address Registration" display screen is displayed on the display of the output device 1200 to prompt its own user to enter its own terminal address and to instruct whether to store its own terminal address in the outgoing file 6210.

Figure 11:
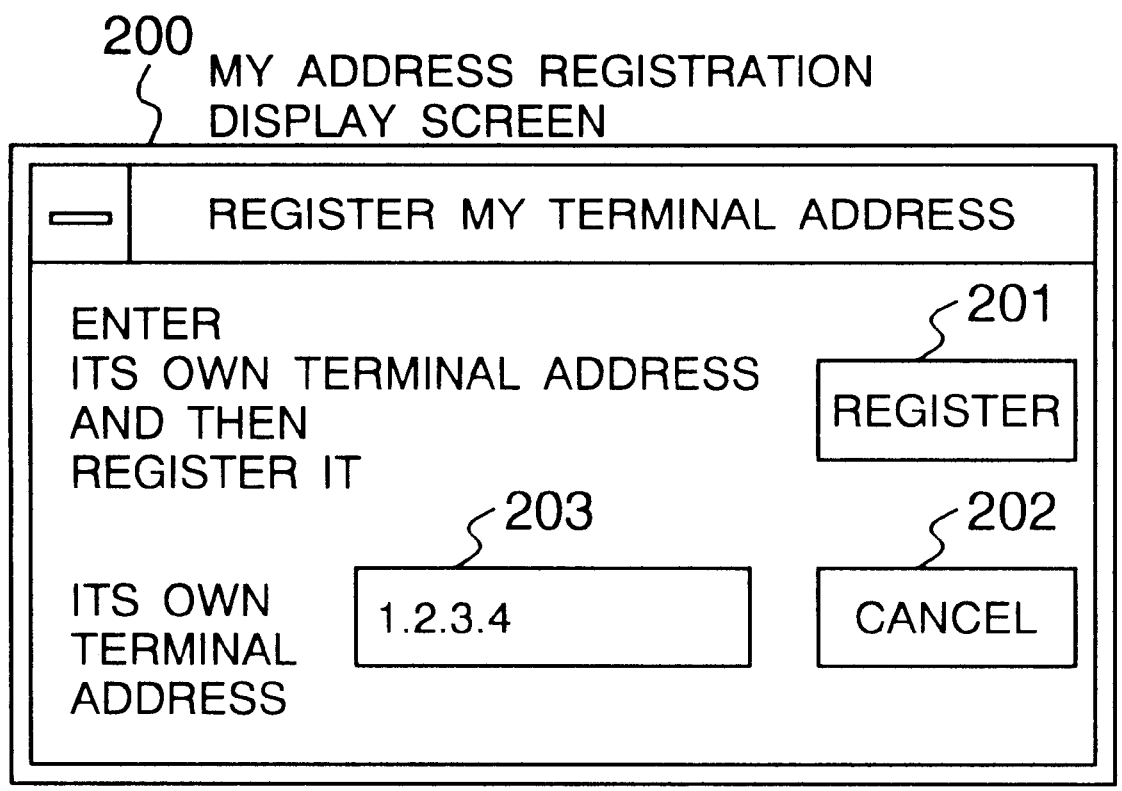
FIG. 11 is a diagram for explaining an example of my address registration display screen.

The "My Address Registration" display screen may be set, for example, as shown in FIG. 11. In the drawing, numeral 200 denotes a "My Address Registration" display screen, 201 denotes a "Registration" button 201 by which its own user can instruct to register my address in the outgoing file 6210, 202 denotes a "Cancel" button 202 by which its own user can instruct not to register my address in the outgoing file 6210, and 203 denotes a my address input field 203 from which its own user can get its own address.

On the "My Address Registration" display screen 200, when its own user enters its own address in the my address input field 203 and clicks the "Registration" button 201 with use of a mouse as the input device 1100, that is, when its own user instructs to register the entered my address in the outgoing file 6210 (step 14), the automatic outgoing start process proceeds to a step 8 to prepare the outgoing file 6210. On the "My Address Registration" display screen 200, on the other hand, when its own user clicks the "Cancel" button 202 to instruct not to register my address in the outgoing file 6210 (step 14), the communication terminal terminates its operation.

When the automatic outgoing start process proceeds from the step 6 to the step 8, for the purpose of prompting its own user to instruct whether to store my address obtained in the step 4 in the outgoing file 6210, a "My Address Confirmation" display screen (not shown) may be given on the display. The "My Address Confirmation" display screen may be set similarly as shown in the "My Address Registration" display screen 200 of FIG. 11, in which case the my address obtained at the step 4 may be displayed on the my address input field 203.

When its own user starts mail send/receive process portion, the outgoing file 6210 stored in the storage device 1600 at the step 10 is transmitted via the other-media communication control portion 5500 to the mail server 2000 as an electronic mail directed to his desired party user.

Figure 7:
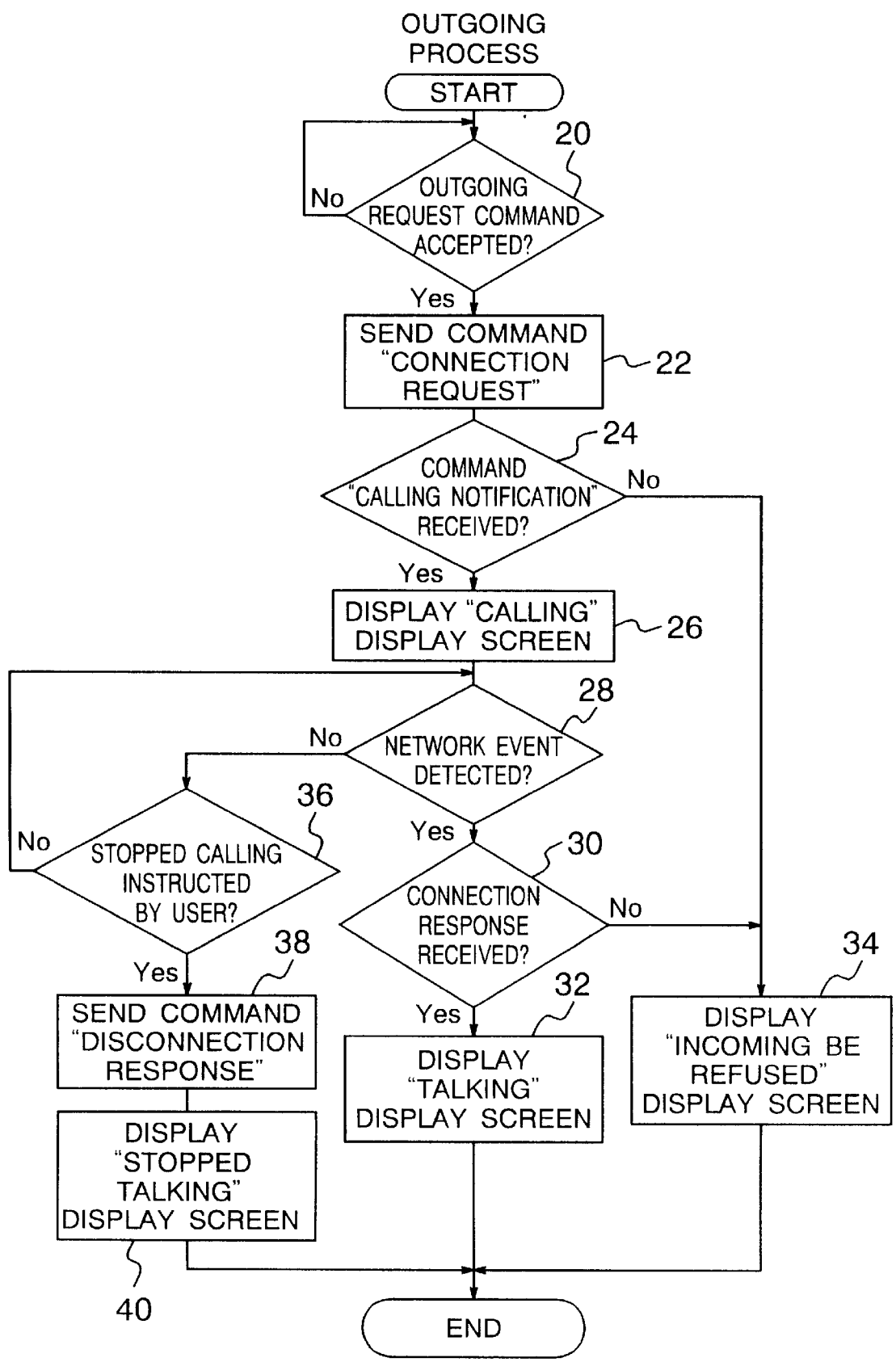
FIG. 7 is a flowchart for explaining an outgoing process carried out by an outgoing/incoming process control portion in a communication system in accordance with a first embodiment of the present invention.

Shown in FIG. 7 is a flowchart for explaining the sending operation of the outgoing/incoming process control portion 5231. The outgoing process is activated when the outgoing request command 7000 is issued from the automatic outgoing start process portion 6200.

As shown in FIG. 7, the outgoing/incoming process control portion 5231, when accepting the outgoing request command 7000 issued from the automatic outgoing start process portion 6200 (step 20), first sends a command 'connection request' for establishment of a communication channel with the associated communication terminal 1000 to the communication terminal 1000 corresponding to the party terminal address set in the outgoing request command 7000, performing its outgoing operation (step 22).

Subsequently, the outgoing/incoming process control portion 5231 judges whether a command returned back as a response to the issued command 'connection request' is 'calling notification' or 'disconnection response' (step 24). When the outgoing/incoming process control portion 5231 determines that the received command is 'calling notification', this means that the outgoing/incoming process control portion 5231 is calling the user of the communication terminal 1000 as the communication destination. Thus, the outgoing/incoming process control portion causes appearance of a "Calling" display screen (indicative of a calling) on the display unit (step 26), waiting as a response for a command to be returned from the communication terminal 1000 of the communication destination.

When receiving a command from the communication terminal 1000 of the communication destination as an additional response (step 28), the outgoing/incoming process control portion 5231 judges whether the received command is of the 'connection request' or 'disconnection response' (step 30). The judgement of the 'connection request' at the outgoing/incoming process control portion 5231 means that the user of the communication terminal 1000 of the communication destination accepted the 'connection request', i.e., means to the establishment of a communication channel with the communication terminal 1000 of the communication destination. Thus, a "Talking" display screen indicative of the establishment of the communication channel appears on the display screen (step 32), enabling communication between its own user and the user of the communication terminal 1000 of the communication destination.

When the outgoing/incoming process control portion 5231 receives the command 'disconnection response' as a response to the 'connection request' from the party terminal (step 24), on the other hand, this means that the communication terminal 1000 corresponding to the party terminal address was not connected or the communication is improper, with the result that a "Incoming be Refused" display screen indicative of the incoming failure appears on the display unit (step 34). In this connection, in the communication system of the first embodiment, as will be explained later in connection with incoming operation, when the communication terminal 1000 receives the command 'connection request' during its communication with other communication terminal 1000, it is designed not to accept the incoming command 'connection request' from the communication terminal 1000 which sent the command, even in which case the originator communication terminal receives the command 'disconnection response' from the destination communication terminal.

When the originator communication terminal failed to receive an additional command from the communication terminal 1000 of the communication destination (step 28), the originator communication terminal judges on the "Calling" display screen whether or not its own user is instructing its own communication terminal to stop the calling operation (step 36). When its own user is not instructing to stop the calling operation, the its own communication terminal returns to the step 28. If its own user already instructs to stop the calling operation on the "Calling" display screen (step 36), then the originator communication terminal sends the command 'disconnection response' (step 38) in order not to establish the communication channel with the party communication terminal 1000, while causing appearance of a "Disabled Talking" display screen indicative of the stopped calling operation (step 40).

When the originator communication terminal receives the command 'disconnection response' from the destination communication terminal 1000 as an additional response (step 30), this means that the user of the communication terminal 1000 of the communication destination refused to accept the incoming of the command. Thus, the originator communication terminal proceeds to the step 34 to cause appearance of the "Incoming be Refused" display screen indicative of the refused command on the display unit.

Figure 8:
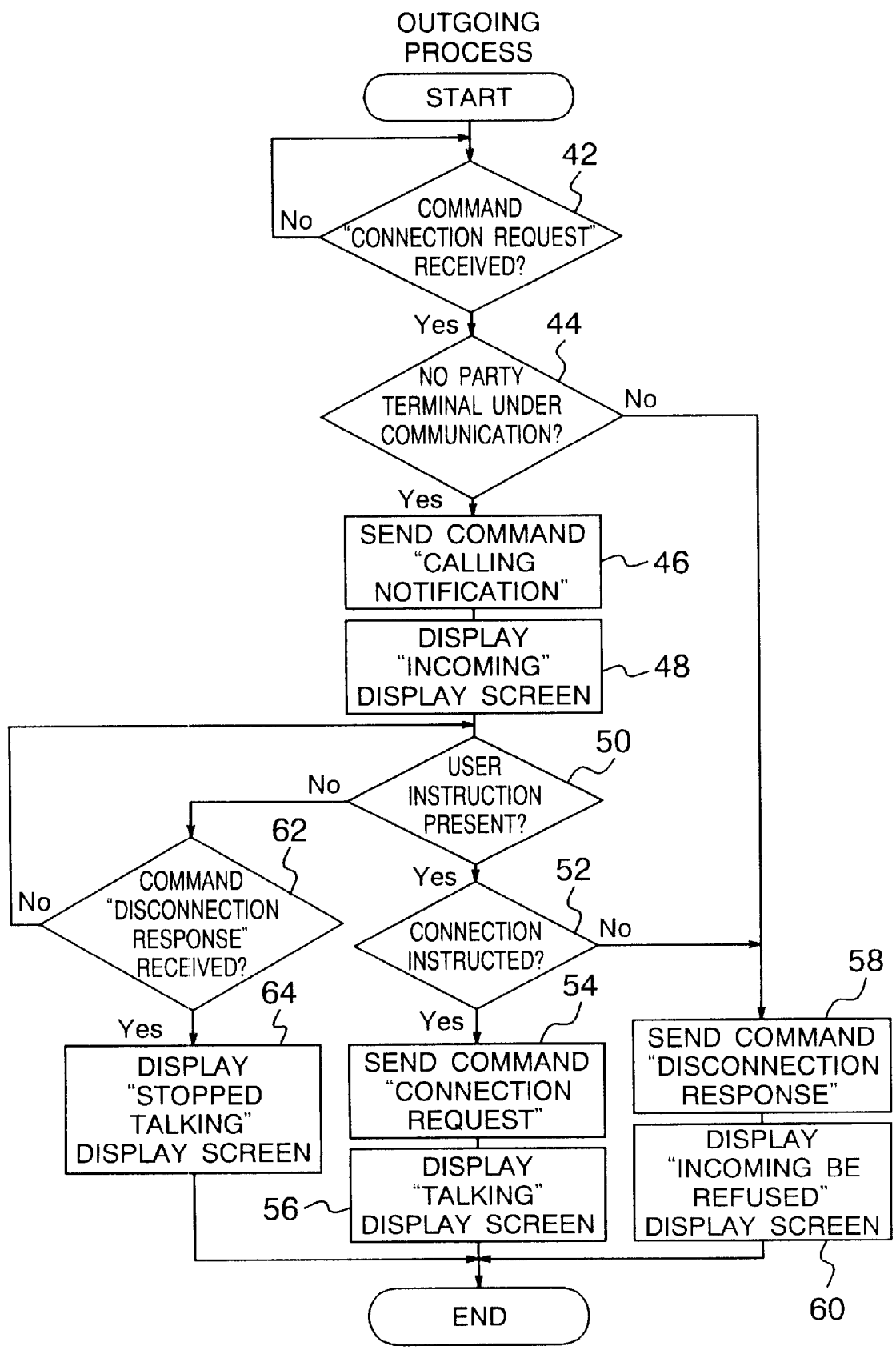
FIG. 8 is a flowchart for explaining an incoming process carried out by the outgoing/incoming process control portion in the communication system in accordance with the first embodiment of the present invention.

FIG. 8 shows a flowchart for explaining incoming operation carried out by the outgoing/incoming process control portion 5231. The incoming process is activated when the originator communication terminal receives the command 'connection request'. As shown in FIG. 8, when receiving the command 'connection request' from the other communication terminal 1000 via the communication network 3000 (step 42), the outgoing/incoming process control portion 5231 first judges whether or not its own communication terminal is communicating with the other communication terminal 1000 (step 44).

The communication system of the first embodiment is arranged, for the purpose of eliminating the inconvenience of its own user of having to respond to the incoming command from yet another communication terminal 1000 during the communication with the other party communication terminal 1000, so that its own communication terminal, when receiving the command 'connection request' during the communication with the other party communication terminal 1000, refuses to the incoming of the command 'connection request' from the command originator communication terminal.

To this end, when such a communication terminal 1000 is communicating with the other communication terminal 1000 (step 44), my communication terminal sends to the command sender terminal the command 'disconnection response' not to establish a communication channel with the command sender terminal 1000 (step 58). In this case, however, in order to cause the user of my communication terminal to know the presence of the incoming command, my communication terminal causes appearance of the "Incoming be Refused" display screen indicative of the incoming command refusal (step 60).

Meanwhile, when my communication terminal is not now communicating with any other communication terminal (step 44), my communication terminal transmits a command "calling notification" indicative of calling its destination terminal to the communication terminal 1000 of the command 'connection request' sender (step 46), and at the same time, causes appearance of an "Incoming" display screen indicative of the presence of the incoming command on the display unit (step 48).

Subsequently, when its own user enters an instruction on the "Incoming" display screen (step 50), the outgoing/incoming process control portion 5231 judges whether the instruction is of a connection to accept the incoming command or of a disconnection not to accept the incoming command (step 52).

In the case of the connection instruction (step 52), my communication terminal sends the command 'connection response' to the communication terminal 1000 of the command 'connection request' sender to inform the command sender of the acceptance of sender's command (step 54), and at the same time, causes appearance of the "Talking" display screen indicative of the establishment of the communication channel (step 56), thus enabling communication between my terminal user and the user of the communication terminal 1000 of the command 'connection request' sender.

On the "Incoming" display screen, if my terminal user fails to enter any instruction (step 50), then my communication terminal goes to a step 62. When failing in the step 61 to receive the command 'disconnection response' from the communication terminal 1000 of the command 'connection request' sender, my communication terminal returns to the step 50. When receiving the command 'disconnection response' (step 62), my communication terminal causes appearance of the "Stopped Talking" display screen indicative of the stopped calling on the display unit (step 64).

On the "Incoming" display screen, when the instruction entered by my user is of a 'connection refusal' (step 52), my communication terminal proceeds to a step 58, where the terminal sends the command 'disconnection response' to the communication terminal 1000 of the command 'connection request' sender.

Figure 9:
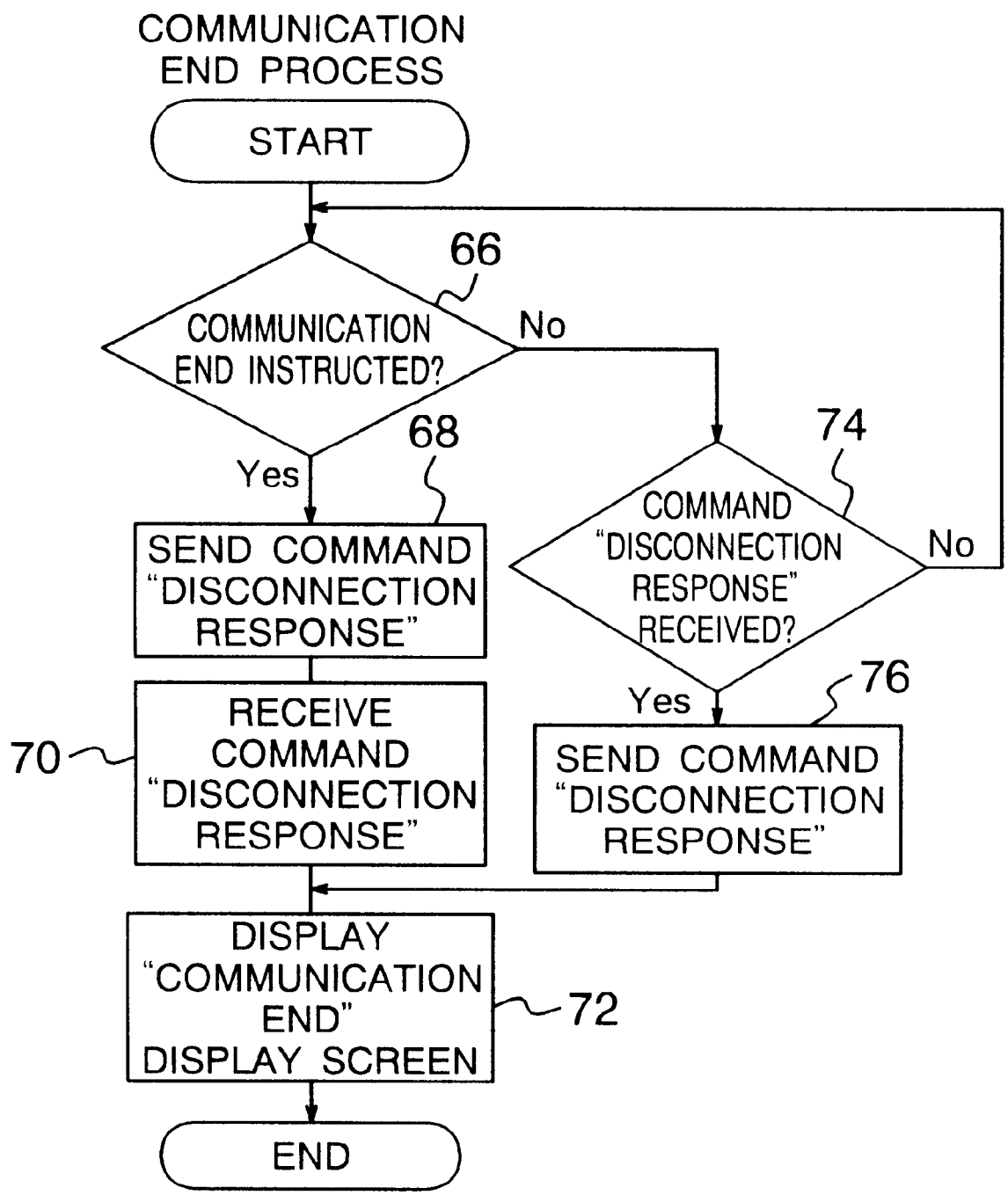
FIG. 9 is a flowchart for explaining a communication terminating process carried out by the outgoing/incoming process control portion in the communication system in accordance with the first embodiment of the present invention.

Shown in FIG. 9 is a flowchart for explaining the communication end operation of the outgoing/incoming process control portion 5231.

The communication end operation is activated during the communication with the other communication terminal 1000 when my user enters an instruction to terminate the communication.

As shown in FIG. 9, my user enters the communication end instruction to terminate the communication on the "Talking" display screen (step 66), the outgoing/incoming process control portion 5231 first to the party communication terminal 1000 the command 'disconnection response' to disconnect the communication channel from the party terminal (step 68).

When receiving the command 'disconnection response' from the party terminal as a response to the command 'disconnection response' (step 70), my communication terminal causes appearance of the communication end display screen indicative of an end of the communication on the display unit (step 72), thus terminating the communication so far carried out between my user and the user of the party communication terminal 1000.

When my user fails to enter the communication end instruction on the "Talking" display screen to terminate the communication (step 66), the outgoing/incoming process control portion 5231 proceeds to a step 74. When my communication terminal fails at the step 74 to receive the command 'disconnection request' from the party communication terminal 1000, my terminal returns to the step 66. Whereas, when my terminal receives at the step 74 the command 'disconnection request', my terminal goes to a step 76 to send the command 'disconnection response' to the party communication terminal 1000 and then goes to a step 72. At the step 72, the communication end display screen indicative of the end of the communication is displayed on the display unit.

Now the operation of the communication terminal 1000 in the communication system of the first embodiment will be detailed in connection with FIG. 10.

Explanation will next be made as to a sequence when a user A of the communication terminal 1000a does not know the terminal address of the communication terminal 1000b of a user B with which the user A want to communicate and thus requests the user B to perform reply communication. In this connection, it is assumed that the terminal address of the communication terminal 1000a is "1.2.3.4".

Figure 10:
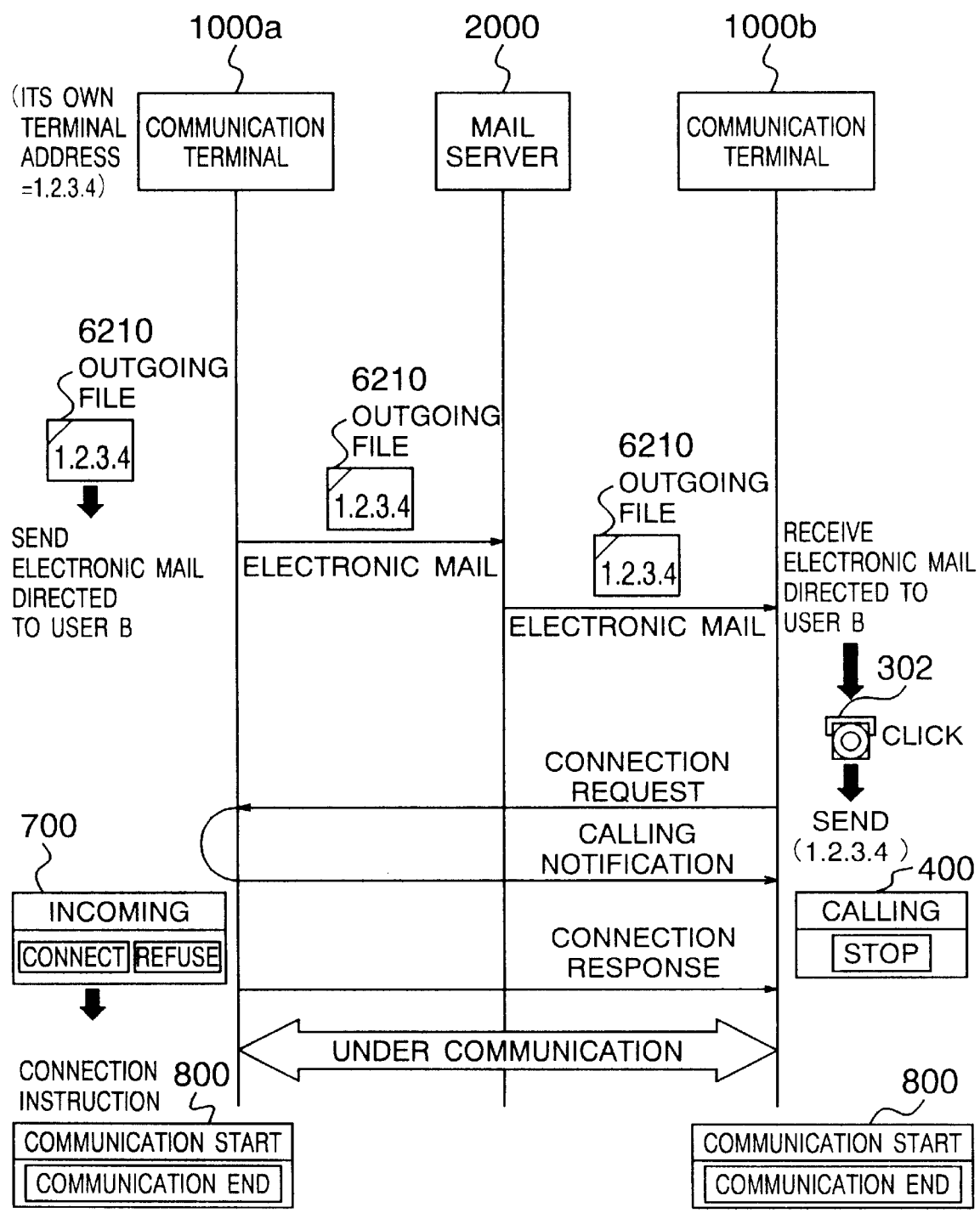
FIG. 10 is a sequence diagram for explaining the detailed operations of communication terminals in the communication system of the first embodiment.

As shown in FIG. 10, the communication terminal 1000a first gets its own terminal address "1.2.3.4" and stores in the storage device 1600 the outgoing file 6210 having the got its own address "1.2.3.4" stored therein. The communication terminal 1000a then transmits the outgoing file 6210 stored in the storage device 1600 to the mail server 2000 as an electronic mail addressed to the user B.

When the communication terminal 1000b of the user B receives the electronic mail addressed to the user B from the mail server 2000 and the received electronic mail is the outgoing file 6210, this means that the communication terminal 1000b is requested to perform reply communication. In response to the request, the communication terminal 1000b displays an icon 302 on the display screen to prompt the user B to instruct the reply communication with respect to the communication terminal 1000a corresponding to the terminal address "1.2.3.4" stored in the outgoing file 6210. When the user B now clicks the mouse on the icon 302, this causes the outgoing file 6210 to be related and the automatic outgoing start process portion to be activated, whereby the outgoing process starts and the communication terminal 1000b performs the reply communication to the communication terminal 1000a.

At this time, an "Incoming" display screen 700 appears on the display unit in the communication terminal 1000a, while a "Calling" display screen 400 appears on the display unit in the communication terminal 1000b.

When the user A enters a connection instruction in the "Incoming" display screen 700 to accept the incoming signal, a communication channel is established between the communication terminals 1000a and 1000b and thus the users A and B can communicate with each other.

At this time, a "Talking" display screen 800 appears on each of the communication terminals 1000a and 1000b.

In an electronic mail receive mode, the communication terminal 1000 can receive a plurality of electronic mails directed to its own user and can display a mailing list including these electronic mails on the display. Therefore, when receiving a plurality of electronic mails directed to its own user B, the communication terminal 1000b searches the mailing list for the outgoing file 6210. When the communication terminal 1000b successfully searches for the outgoing file 6210, it displays the icon 302 on the display screen.

In FIG. 10, the "Incoming" display screen 700 corresponds to the "Incoming" display screen displayed on the display unit at the incoming operation step 48 in FIG. 8, the "Calling" display screen 400 corresponds to the "Calling" display screen displayed on the display unit at the outgoing operation step 26 in FIG. 7, and the "Talking" display screen 800 corresponding to the "Talking" display screen displayed on the display unit at the outgoing operation step 32 in FIG. 7 and to the "Talking" display screen displayed on the display unit at the incoming operation step 56 in FIG. 8.

As has been explained above, in accordance with the communication system of the first embodiment, even when the user of the communication terminal 1000 does not know the terminal address allocated to his desired party communication terminal 1000, the originator terminal user can ask the user of the party communication terminal 1000 to perform the reply communication by sending the outgoing file 6210 having the terminal address allocated to its own communication terminal 1000 to the mail server 2000 as an electronic mail directed to the party user.

The party user asked to perform the reply communication, when receiving the outgoing file 6210 as an electronic mail directed to the party user, can communicate with the originator user only by entering an instruction to perform the reply communication to the communication terminal (i.e., of the user asking the reply communication) 1000 corresponding to the terminal address stored in the outgoing file 6210.

In particular, when the received electronic mail is the outgoing file 6210 in the destination communication terminal 1000, the destination terminal can display the icon 302 on the display unit to prompt the destination user to perform the reply communication. Thus, when the destination user (asked to perform the reply communication) received the outgoing file 6210 as the electronic mail clicks the mouse on the icon 302, this means that the destination user entered an instruction to perform the reply communication. In this way, user's operation at the time of entering the instruction to perform the reply communication can be simplified as related to user's operation at the time of receiving the electronic mail.

Even in the case where the terminal address of the communication terminal 1000 is dynamically allocated and the user of the communication terminal 1000 does not know the terminal address of the party user, the originator user can inform the party user of originator user's terminal address by sending the outgoing file 6210 having the terminal address stored therein to the mail server 2000 as an electronic mail directed to the party user.

According to the communication system of the first embodiment, further, since the terminal address of the communication terminal 1000 will not be known to any users except for the desired party user, it can beforehand be prevented that the communication terminal 1000 receives unnecessary incoming signals from the other communication terminals 1000 other than the desired party communication terminal.

Furthermore, the communication system of the first embodiment is arranged so that, when the communication terminal receives an incoming signal in the middle of communicating with the other communication terminal 1000, the system refuses the incoming signal, thus enabling the smooth communication.

In the case where the communication terminal 1000 which sent the outgoing file 6210 as the electronic mail directed to the party user is of such a type that its terminal address is dynamically allocated at the time of its connection, the completion of the terminal connection may cause such a situation that not only the communication terminal is put in its not-allocated terminal-address state but also the terminal address so far allocated thereto is allocated to the other communication terminal 1000. For this reason, at the time point that the communication terminal 1000 of the party user performs the reply communication to the communication terminal 1000 corresponding to the terminal address contained in the outgoing file 6210 received as the electronic mail, if the originator communication terminal 1000 of the user (who asked to perform the reply communication) who sent the outgoing file 6210 as the electronic mail already finishes its connection, then such a situation may occur that the destination communication terminal fails to find the originator communication terminal or the replay communication is directed to the communication terminal 1000 different from the communication terminal who asked the reply communication.

In order to avoid the users other than the reply communication asker to accept the incoming signal based on the reply communication, the communication terminal 1000 is only required, when receiving the incoming signal based on the reply communication, to certify that the terminal asked the reply communication.

This is realized by arranging the communication system of the present invention so that certification information in addition to its own terminal address is stored in the outgoing file 6210, the communication terminal 1000 of the party user who received the outgoing file 6210 as its electronic mail returns the certification information when performing the reply communication; whereby the communication terminal 1000, when receiving reply incoming signal, can collate the certification information stored in the outgoing file 6210 sent as the electronic mail with the received certification information and can judge whether or not to be the asker of the incoming signal.

Explanation will then be made, as an example, as to a communication system of a second embodiment wherein the certification information in the form of a password entered by the user is stored in the outgoing file 6210.

The communication system of the second embodiment is partly different from that of the first embodiment in the automatic outgoing start operation of the automatic outgoing start process portion 6200 and the outgoing and incoming operations of the outgoing/incoming process control portion 5231.

Figure 12:
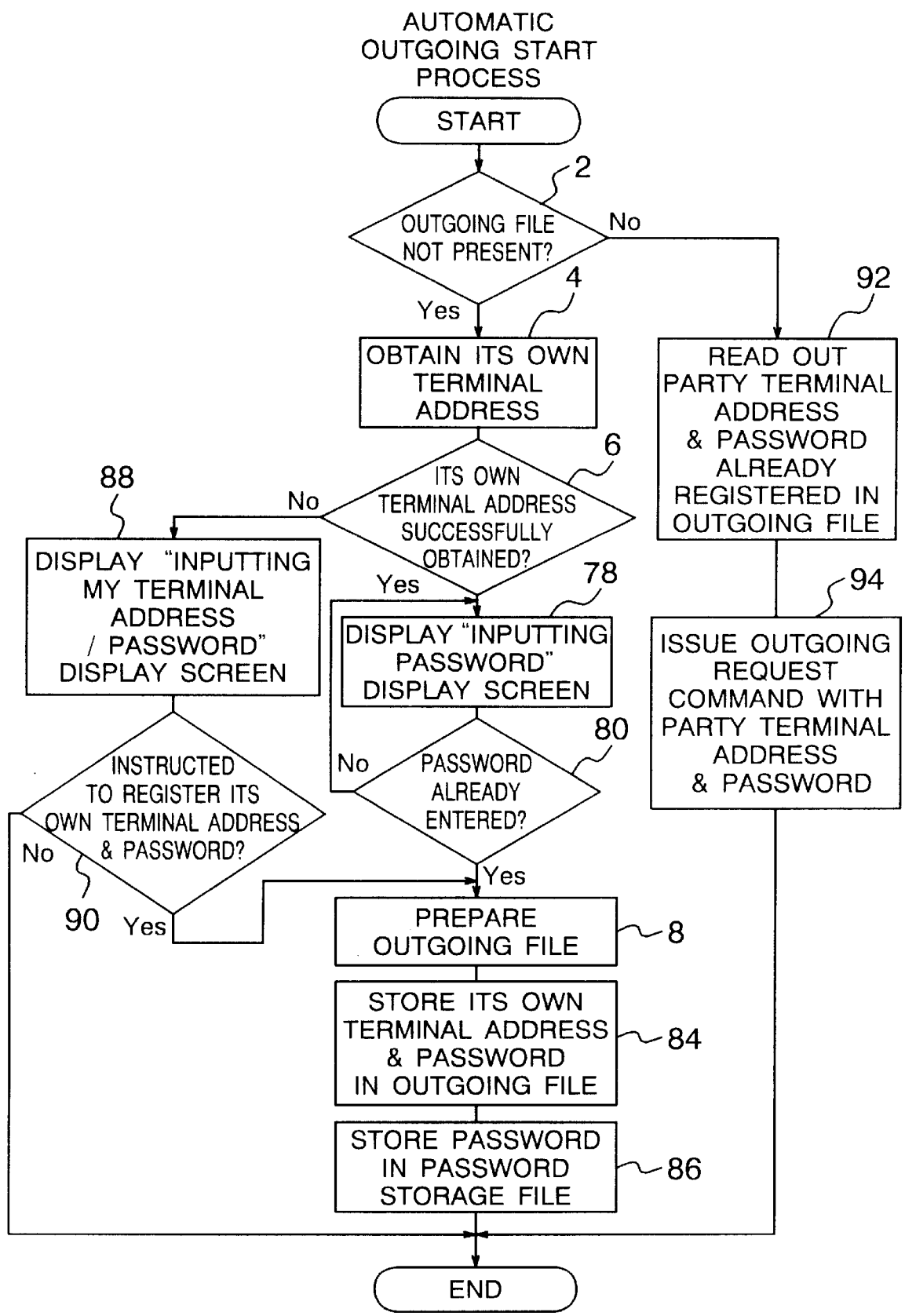
FIG. 12 is a flowchart for explaining an automatic outgoing start process carried out by an automatic outgoing start process portion in a communication system of a second embodiment of the invention.

There is shown in FIG. 12 a flowchart for explaining automatic outgoing start operation carried out by the automatic outgoing start process portion 6200.

As shown in FIG. 12, the automatic outgoing start process portion 6200 performs the same automatic outgoing start process as in the FIG. 6 at steps 2, 4, 6 and 8.

In the automatic outgoing start process in the communication system of the second embodiment, on the other hand, the automatic outgoing start process portion 6200, when successfully getting its own terminal address (step 6), proceeds to a step 78 to cause appearance of a "Inputting Password" display screen on the display unit and to prompt its own user to enter certification information (password in this example) for certifying its own user.

When its own user enters the password of its own user in the "Inputting Password" display screen (step 80), proceeds to a step 8 to prepare the outgoing file 6210, store its own terminal address and password in the outgoing file 6210 and store the outgoing file in the storage device 1600 (step 84).

The communication system of the second embodiment is arranged so that, when my communication terminal receives the incoming signal based on the reply communication, my user collates the password entered by my user with the returned password. To this end, in the second embodiment, the password entered by my user is previously stored in a password storage file for exclusive storage of passwords and the file is then stored in the storage device 1600 (step 86).

When the automatic outgoing start process portion 6200 fails to get its own terminal address (step 6), the automatic outgoing start process portion goes to a step 88 to prompt its own user to enter its own terminal address and password to be stored in the outgoing file 6210.

More specifically, in the step 88, in order for my user to enter my terminal address and password as well as an instruction indicative of whether to enter these address and password in the outgoing file 6210, an "Inputting My Terminal Address/Password" display screen appears on the display unit.

In the "Inputting My Terminal Address/Password" display screen, when my user enters my terminal address and password as well as an instruction indicative of inputting these address and password in the outgoing file 6210 (step 90), the automatic outgoing start process portion 6200 proceeds to the step 8 to prepare the outgoing file 6210. When my user enters an instruction indicative of not inputting my address and password in the outgoing file 6210 (step 90), the automatic outgoing start process portion 6200 terminates its operation.

In the communication system of the second embodiment, since my terminal address and password are stored in the outgoing file 6210 in this way, so that, when the automatic outgoing start process portion is activated as associated with the specification of any outgoing file 6210 (step 2), the automatic outgoing start process portion 6200 reads out the terminal address (party terminal address) and password associated with the start time of the automatic outgoing start operation from the outgoing file 6210 (step 92), prepares the outgoing request command 7000 the read-out terminal address and password set therein, and then issues the command to the communication control portion 5000 (step 94).

With the communication system of the second embodiment, in such an outgoing process as shown in FIG.

7, the outgoing/incoming process control portion 5231, when accepting the outgoing request command 7000 from the automatic outgoing start process portion 6200 (step 20), transmits at the step 22 the command 'connection request' for establishment of a communication channel with the party communication terminal 1000 to the communication terminal 1000 corresponding to the party terminal address set in the outgoing request command 7000, at which time the command transmission is carried out with the password set in the outgoing request command 7000 attached to the command 'connection request'.

With the communication system of the second embodiment, in such incoming process as shown in FIG. 8, the outgoing/incoming process control portion 5231, when not communicating with any other communication terminal 1000 (step 44), additionally carries out its collating operation to collate the password received from the command 'connection request' with the password stored in the password storage file. When finding a coincidence therebetween in the collating operation, the outgoing/incoming process control portion 5231 proceeds to a step 46; while, when failing to find a coincidence, the outgoing/incoming process control portion 5231 goes to a step 58.

The detailed operation of the communication terminals 1000 in the communication system of the second embodiment will now be explained with reference to FIG. 13.

Explanation will be made as to a sequence in connection with a case where the user A of the communication terminal 1000*a* does not know the terminal address of the communication terminal 1000*b* with which the user B want to communicate and the user A asks the user B to perform the reply communication. It is assumed in this case that the communication terminal 1000*a* has a terminal address of terminal address "1.2.3.4".

Figure 13:
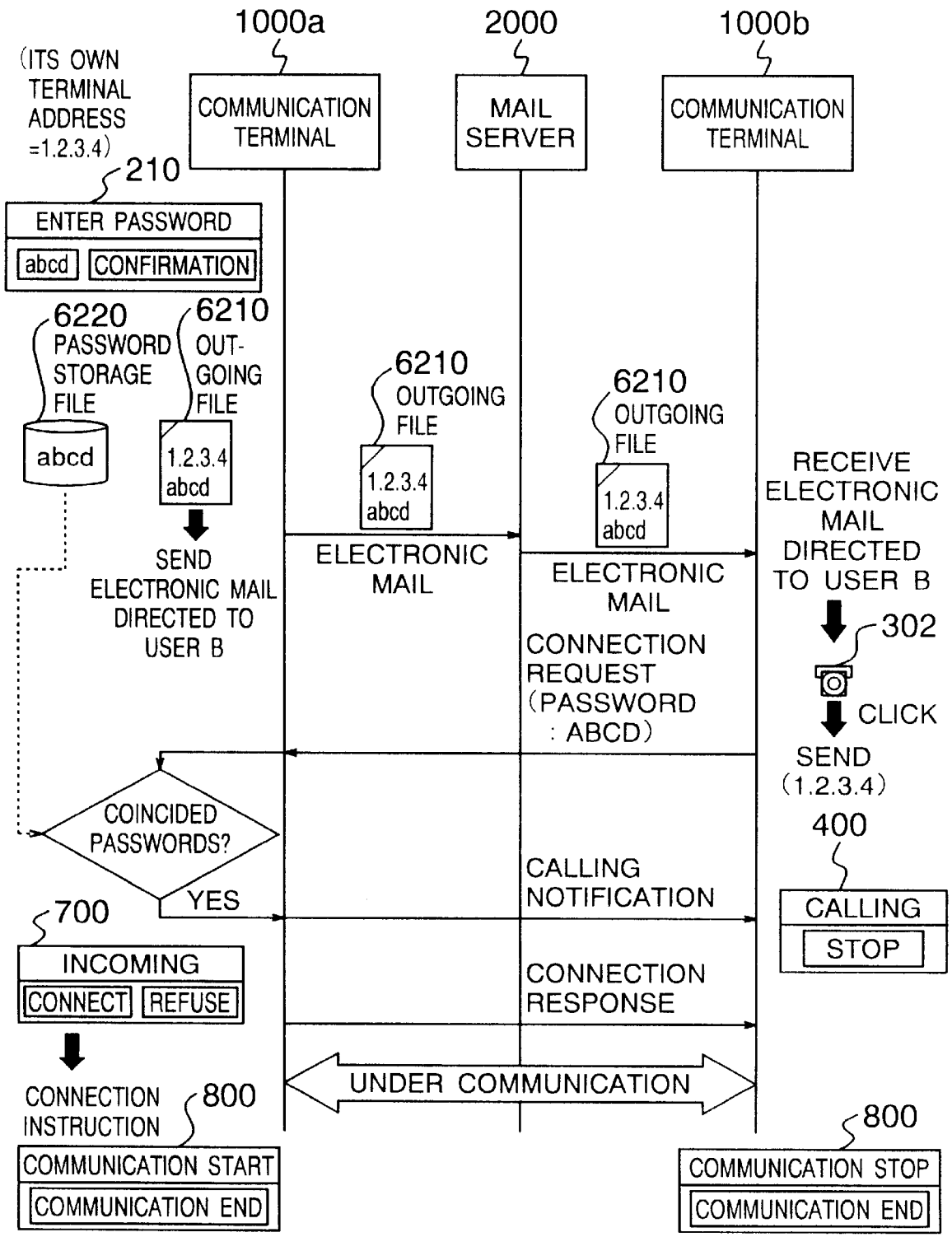
FIG. 13 is a sequence diagram for explaining the detailed operations of communication terminals in the communication system of the second embodiment.

As shown in FIG. 13, the communication terminal 1000*a* first get its own terminal address terminal address "1.2.3.4." and prompts its own user to enter its own password in a "Inputting Password" display screen 210. When its own user enters "abcd" as a password for example, the communication terminal 1000*a* stores the got its own terminal address terminal address "1.2.3.4." as well as the password entered by the user A in the outgoing file 6210, stores the outgoing file in the storage device 1600, stores the password "abcd" in a password storage file 6220, and stores the password storage file in the outgoing file 6210. Subsequently, the communication terminal 1000*a* sends the outgoing file 6210 stored in the storage device 1600 to the mail server 2000 as an electronic mail directed to the user B.

When the user B of the communication terminal 1000*b* receives the electronic mail directed to the user B from the mail server 2000 and the received mail is the outgoing file 6210, this means the user B is asked to perform the reply communication. Thus, the communication terminal 1000*b* causes appearance of the icon 302 on the display unit to prompt the user B to inform the communication terminal 1000*a* of the reply communication. When the user B clicks the mouse on the icon 302, the automatic outgoing start process portion is activated as associated with any outgoing file 6210 to start the outgoing process, whereby the communication terminal 1000*b* performs the reply communication to the communication terminal 1000*a*. In the communication system of the second embodiment, as has been explained above, the password "abcd" stored in the outgoing file 6210 is attached to the command 'connection request' to be transmitted at the time of the reply communication.

The communication terminal 1000*a*, when receiving the command 'connection request', collates the password "abcd" attached to the received command 'connection request' with the password "abcd" stored in the password storage file 6220. Since both passwords are identical in this case, the communication terminal 1000*a* determines its own user A asked the user B of the communication terminal 1000*b* the reply communication, and then transmits a command "calling notification" to the communication terminal 1000*b* which sent the command 'connection request'.

At this time, the "Incoming" display screen 700 appears on the display unit in the communication terminal 1000*a*; while the "Calling" display screen 400 appears on the display unit in the communication terminal 1000*b*.

In the "Incoming" display screen 700, when the user A enters an instruction indicative of acceptance of the incoming signal, a communication channel is established between the communication terminals 1000*a* and 1000*b* to enable communication between the users A and B.

In the above communication mode, the "Talking" display screen 800 appears on the respective display units of the communication terminals 1000*a* and 1000*b*.

The communication terminal 1000 in the electronic-mail receive mode can receive a plurality of electronic mails directed to its own user and can display a mailing list including the received electronic mails on the display unit. To this end, when receiving a plurality of electronic mails directed to its own user B, the communication terminal 1000*b* searches the mailing list for the outgoing file 6210, and when successfully searching for the file, displays the icon 302 in the display unit.

In FIG. 13, the password storage file 6220 corresponds to the password storage file having the password stored therein at the step 86 of the automatic outgoing start process of FIG. 12, while the "Inputting Password" display screen 210 corresponds to the "Inputting Password" display screen given at the step 78 in the automatic outgoing start process of FIG. 12. Although the password "abcd" entered by its own user has been displayed on the "Inputting Password" display screen 210 as it is for easy understanding of the explanation in FIG. 13, the password per se may not be displayed if necessary to avoid a third party to have a change of knowing the password.

As has been explained in the foregoing, in accordance with communication system of the second embodiment, the certification information (password) for certification of the user who asked the reply communication is used so that, when receiving the incoming signal based on the reply communication from the other communication terminal 1000, the originator communication terminal 1000 can judge whether or not the incoming signal is from the communication terminal 1000 of the party user with who the originator user wanted on the certification information received therefrom and attached to the command 'connection request', with the result that the originator communication terminal 1000 can accept only the right reply communicated on the reply communication from the right destination communication terminal, thus preventing the other incoming signals unnecessary for the originator user.

The above communication system of the second embodiment is arranged so that the communication terminal 1000 previously stores the password in the outgoing file 6210 and also stores the outgoing file 6210 in the password storage file 6220 to collate the stored password with the password received as attached to the command 'connection request'. However, such an arrangement may be possible that the password storage file 6220 is not used and, when receiving the command 'connection request' having the password attached thereto, the originator communication terminal 1000 prompts its own user to enter its own password for the collating operation.

Explanation will next be made as to a third embodiment of the communication system wherein the user of the originator communication terminal again enters its own password for the collating operation.

The communication system of the third embodiment is partly different from the that of the second embodiment in the automatic outgoing start process of the automatic outgoing start process portion 6200 and the incoming process of the outgoing/incoming process control portion 5231.

More in detail, in the communication system of the third embodiment, the automatic outgoing start process portion 6200 is carried out after the step 84 and terminates its operation without performing the step 86 in the automatic outgoing start process of FIG. 12.

In the case of the communication system of the third embodiment, in the incoming process of FIG. 8, the outgoing/incoming process control portion 5231, when any communication terminal 1000 now under communication is not present (step 44), additionally performs displaying operation to cause appearance of a "Password Collation" display screen on the display unit to prompt its own user to enter its own password for the collation.

In the "Password Collation" display screen, when its own user enters its own password, its own communication terminal additionally performs the collating operation to collate the password received as attached to the command 'connection request' with the password entered by its own user. When finding a coincidence between the both passwords in the collating operation, the communication terminal proceeds to a step 46, whereas, when failing to find a coincidence therebetween, the communication terminal proceeds to a step 58.

Figure 14:
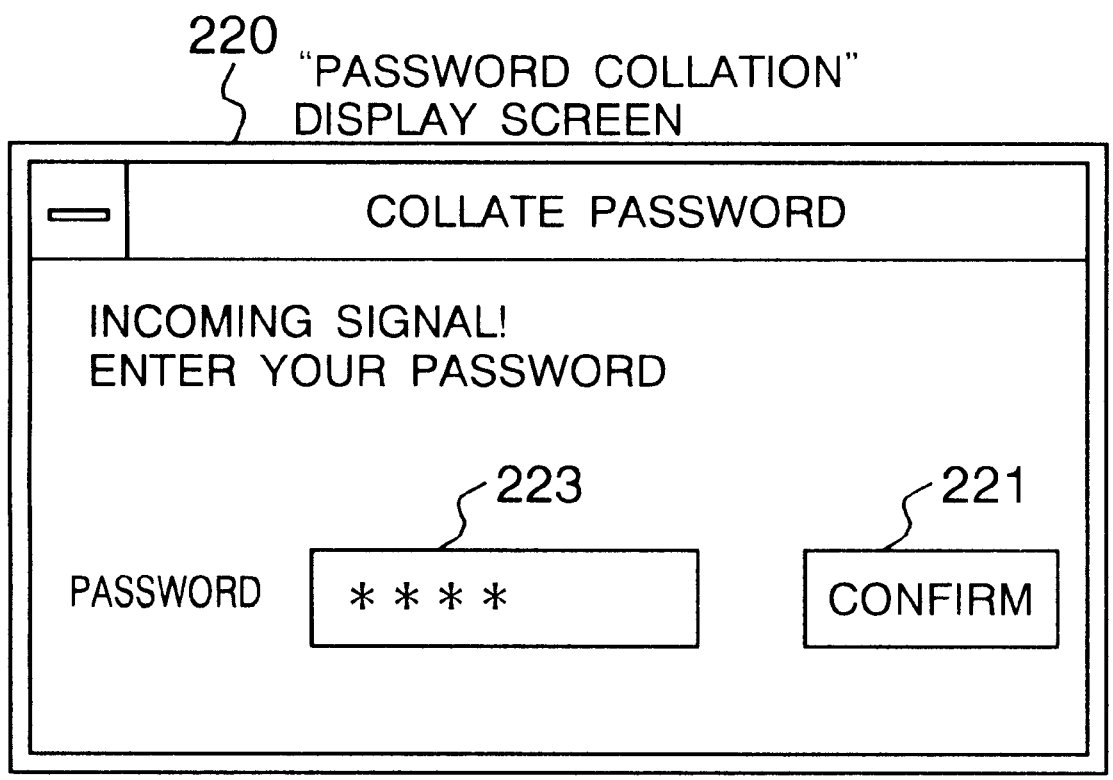
FIG. 14 is a diagram showing an example of a "Password Collation" display screen.

For example, the "Password Collation" display screen may be as shown in FIG. 14. In the drawing, reference numeral 220 denotes a "Password Collation" display screen, 223 denotes an password input field for input of the password by its own user, and 221 denotes an "OK" button with which its own user instructs to use the password inputted by its own user in the password input field 223 for the collating operation.

As has been explained above, in the communication system of the third embodiment, the certification information (password) for certification of the user who asked the reply communication is used so that, when receiving the incoming signal based on the reply communication from the other communication terminal 1000, the originator communication terminal 1000 can judge whether or not the incoming signal is from the communication terminal 1000 of the party user with who the originator user wanted on the certification information received therefrom and attached to the command 'connection request', with the result that, the originator communication terminal 1000 can accept only the right incoming signal based on the reply communication from the right destination communication terminal, thus preventing the other incoming signals unnecessary for the originator user.

In the communication system of the third embodiment, in particular, the terminal address allocated to the communication terminal 1000 is not changed but this is effective even when the user is shifted (not present at the communication terminal) at the time points of asking the reply communication and receiving the incoming signal based on the reply communication.

Though the communication systems of the foregoing second and third embodiments have been designed to use the password entered by the user, the present invention is not limited to the specific example. For example, the ID of the user to which the electronic mail is addressed can also be used as the certification information.

Explanation will then be made as to a fourth embodiment of the communication system wherein the user ID is used as the certification information.

The communication system of the fourth embodiment is partly different from those of the foregoing embodiments in the automatic outgoing start process of the automatic outgoing start process portion 6200 and the outgoing and incoming processes of the outgoing/incoming process control portion 5231.

Figure 15:
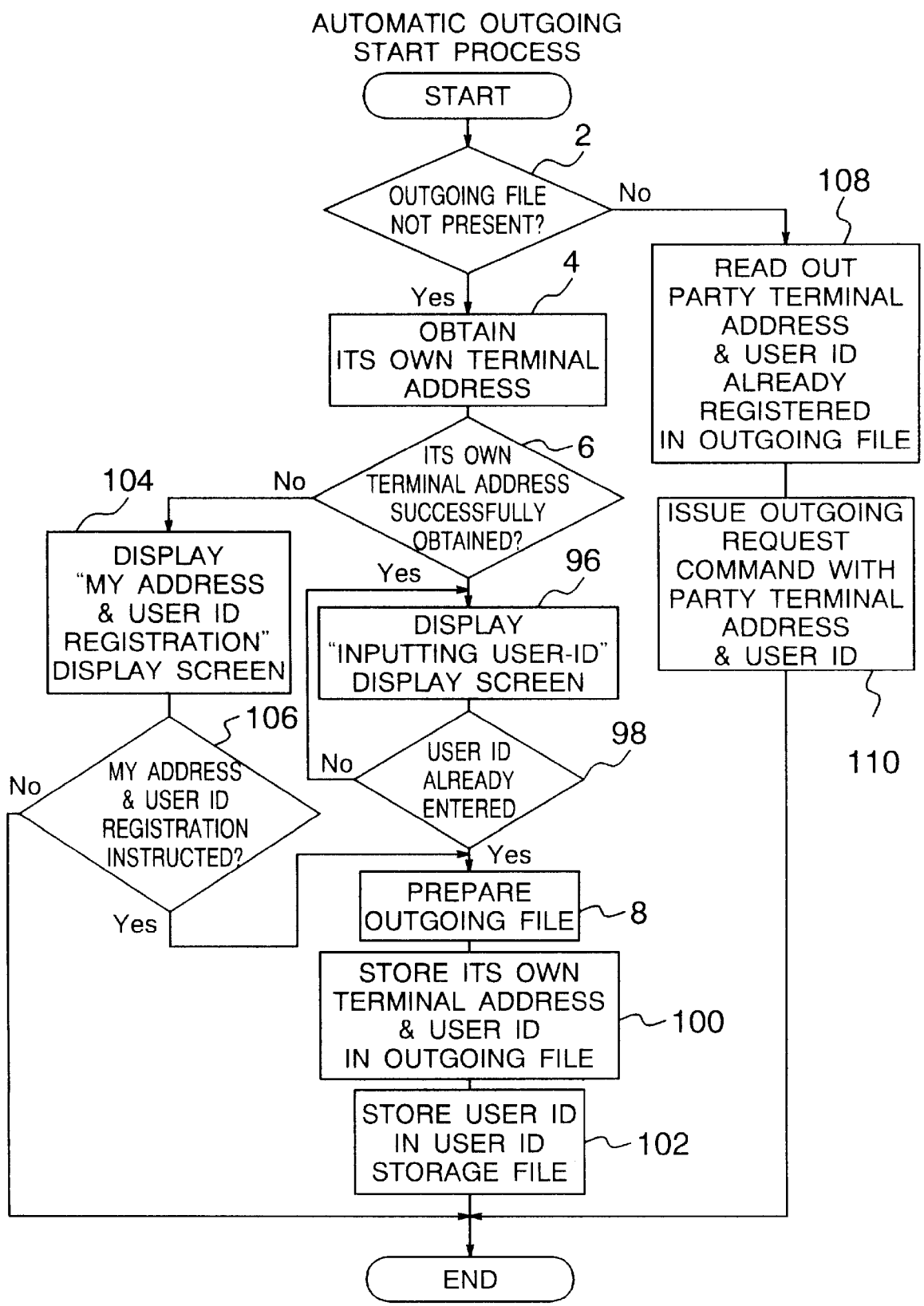
FIG. 15 is a flowchart for explaining an automatic outgoing start process carried out by an automatic outgoing start process portion in a communication system of a fourth embodiment.

Shown in FIG. 15 is a flowchart for explaining the automatic outgoing start process of the automatic outgoing start process portion 6200.

As shown in FIG. 15, in steps 2, 4, 6 and 8, the automatic outgoing start process portion 6200 performs the same operations as in the automatic outgoing start process of FIG. 6.

The automatic outgoing start process portion 6200 of the communication system of the fourth embodiment, when successfully getting its own terminal address (step 6), proceeds to a step 96 and causes appearance of an "Inputting User-ID" display screen on the display unit to prompt its own user to enter the certification information (user ID in this example) for certification of its own user.

When its own user enters its own user ID on the "Inputting User-ID" display screen (step 98), its own communication terminal proceeds to the step 8 to prepare the outgoing file 6210, store its own terminal address and user ID in the outgoing file 6210 and store the outgoing file 6210 in the storage device 1600 (step 100).

In the communication system of the fourth embodiment, the originator communication terminal, when receiving the incoming signal based on the reply communication, collates the user ID entered by its own user with the user ID received simultaneously with the reception of the incoming signal. To this end, the user ID entered by its own user is previously stored in a user ID storage file for exclusive storage of user IDs and stores the user ID storage file in the storage device 1600 (step 102).

When failing to get its own terminal address (step 9), its own communication terminal proceeds to a step 104 to prompt its own user to enter its own terminal address and user ID to be stored in the outgoing file 6210.

At the step 104, more specifically, the communication terminal displays a "My Address & User ID Registration" display screen to prompt its own user to instruct whether or not its own terminal address and user Id are stored in the outgoing file 6210.

In the "My Address & User ID Registration" display screen, when its own user enters its own terminal address and user ID and also enters an instruction indicative of registering the entered terminal address and user ID in the outgoing file 6210 (step 106), its own communication terminal goes to the step 8 to prepare the outgoing file 6210. In the "My Address & User ID Registration" display screen, when its own user enters an instruction indicative of not registering its own terminal address and user ID in the outgoing file 6210 (step 106), its own communication terminal terminates its operation.

In this way, in the in the communication system of the fourth embodiment, its own terminal address and user ID are stored in the outgoing file 6210 so that, when the automatic outgoing start process is activated as associated with the specification of any outgoing file 6210 (step 2), the automatic outgoing start process portion 6200 reads out the terminal address (party terminal address) and user ID from the outgoing file 6210 associated with the start time of the automatic outgoing start process (step 108), prepares the outgoing request command 7000 having the read-out party terminal address and user ID set therein, and then issues the command to the communication control portion 5000 (step 110).

With the in the communication system of the fourth embodiment, in the outgoing process of FIG. 7, the outgoing/incoming process control portion 5231, when accepting the outgoing request command 7000 issued from the automatic outgoing start process portion 6200 (step 20), transmits at a step 22 the command 'connection request' to the communication terminal 1000 corresponding to the party terminal address set in the outgoing request command 7000 to establish a communication channel with the party communication terminal 1000, at which time the command transmission is carried out with the user ID set in the outgoing request command 7000 attached to the command 'connection request'.

With the communication system of the fourth embodiment, as shown in the incoming process of FIG. 8, the outgoing/incoming process control portion 5231, when any communication terminal 1000 under communication is now not present (step 44), additionally performs its collating operation to collate the user ID received as attached to the command 'connection request' with the user ID stored in the user ID storage file. When finding a coincidence between the both user IDs in the collating operation, the communication terminal goes to a step 46; whereas, when failing to find a coincidence therebetween, the terminal goes to a step 58.

Figure 16:
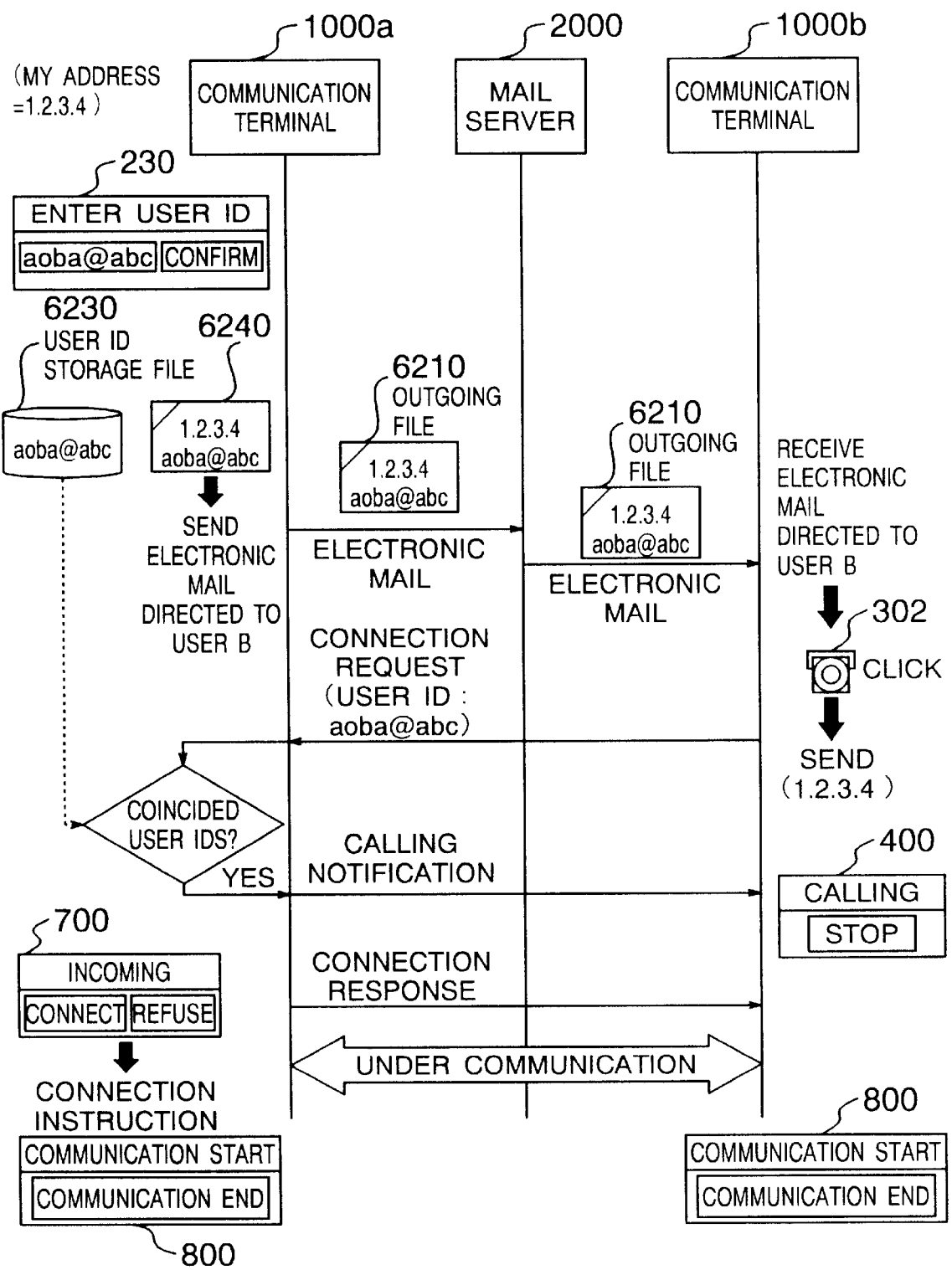
FIG. 16 is a sequence diagram for explaining detailed operations of communication terminals in the communication system of the fourth embodiment.

Explanation will then be as to the detailed operation of the communication terminals 1000 in the communication system of the fourth embodiment, by referring to FIG. 16.

Explanation will be directed to a sequence in a case where the user A of the communication terminal 1000a does not know the terminal address of the communication terminal 1000b of the user B and the user A asks the user B the reply communication. It is assumed in this example that the communication terminal 1000a has a terminal address "1.2.3.4."

As shown in FIG. 16, the communication terminal 1000a first obtains its own terminal address "1.2.3.4." and displays a "Inputting User-ID" display screen 230 to prompt its own user to enter its own user ID. If the user ID entered by its own user is user ID "aoba@abc", then the communication terminal 1000a stores the obtained terminal address "1.2.3.4." and the user ID "aoba@abc" entered by its own user in the outgoing file 6210, stores the outgoing file 6210 in the storage device 1600, stores the user ID "aoba@abc" in user ID storage file 6230, and stores the user ID storage file 6230 in the storage device 1600. Subsequently, the communication terminal 1000a transmits the outgoing file 6210 stored in the storage device 1600 to the mail server 2000 as an electronic mail.

When the communication terminal 1000b of the user B receives the electronic mail directed to the user B from the mail server 2000 and the received electronic mail is the outgoing file 6210, this means that the communication terminal 1000b is asked to perform the reply communication. Thus, the communication terminal 1000a displays on the display unit the icon 302 with which the user B can instruct its own terminal to perform the reply communication over the communication terminal 1000a corresponding to the terminal address "1.2.3.4." stored in the outgoing file 6210. When the user B clicks the mouse on the icon 302, this causes the automatic outgoing start process to be activated as associated with any outgoing file 6210, whereby the communication terminal 1000b performs its reply communication to the communication terminal 1000a. As has been explained in the foregoing, in the communication system of the fourth embodiment, the user ID "aoba@abc" stored in the outgoing file 6210 is attached to the command 'connection request' to be transmitted at the time of performing the reply communication.

The communication terminal 1000a, when receiving the command 'connection request', collates the user ID "aoba@abc" attached to the command 'connection request' with the user ID "aoba@abc" stored in the user ID storage file 6230. In this case, since the communication terminal 1000a finds a coincidence between the both user IDs, the communication terminal 1000a judges that its own user A asked the user B of the communication terminal 1000b the reply communication, and sends the command "calling notification" to the communication terminal 1000b which issued the command 'connection request'.

At this time, the "Incoming" display screen 700 is displayed on the display unit of the communication terminal 1000a, while the "Calling" display screen 400 is displayed on the display unit of the communication terminal 1000b.

When the user A enters an instruction in the "Incoming" display screen 700 to accept the incoming signal, a communication channel is established between the communication terminals 1000a and 1000b, enabling communication between the users A and B.

At this time, the "Talking" display screen 800 appears on the display units of the respective communication terminals 1000a and 1000b.

The communication terminal 1000 can receive a plurality of electronic mails directed to its own user and can display a mailing list including these electronic mails on the display unit. To this end, the communication terminal 1000b, when receiving a plurality of electronic mails directed to its own user B, searches the mailing list for the outgoing file 6210 and, when the searching becomes successful, displays the icon 302 on the display unit.

In FIG. 16, the user ID storage file 6230 corresponds to the user ID storage file having the user ID stored at the step 102 in the automatic outgoing start process of FIG. 15, and the "Inputting User-ID" display screen 230 corresponds to the "Inputting User-ID" display screen displayed on the display unit at the step 96 in the automatic outgoing start process of FIG. 15.

As has been explained above, in the communication system of the fourth embodiment, the certification information (user ID) for certification of the user who asked the reply communication is used so that, when receiving the incoming signal based on the reply communication from the other communication terminal 1000, the originator communication terminal 1000 can judge whether or not the incoming signal is from the communication terminal 1000 of the party user with who the originator user wanted on the certification information received therefrom and attached to the command 'connection request', with the result that, the originator communication terminal 1000 can accept only the right incoming signal based on the reply communication from the right destination communication terminal, thus preventing the other incoming signals unnecessary for the originator user.

In the communication system of the fourth embodiment, although the communication terminal 1000 previously stores in the user ID storage file 6230 the user ID to be stored in the outgoing file 6210 for the purpose of being used in the collating operation with the user ID received as attached to the command 'connection request'; such an arrangement may be possible that the user ID storage file 6230 is not used and its own user again enters the user ID for use in the collating operation at the time of receiving the command 'connection request' having the user ID attached thereto.

Explanation will next be made as to a fifth embodiment of the communication system of the invention in which its own user again enters his own user ID for use in the collating operation.

The communication system of the fifth embodiment is partly different from that of the foregoing embodiment in the automatic outgoing start operation of the automatic outgoing start process portion 6200 and the incoming process of the outgoing/incoming process control portion 5231.

In the communication system of the fifth embodiment, more in detail, in the automatic outgoing start process of FIG. 15, the automatic outgoing start process portion 6200 terminates its operation without performing the step 102 after the step 100.

With the communication system of the fifth embodiment, in the incoming process of FIG. 8, the outgoing/incoming process control portion 5231, when any communication terminal 1000 is now not under communication (step 44), additionally displays on the display unit a "User-ID Collation" display screen for input of its own user's user ID for the collation.

When its own user enters its own user ID in the "User-ID Collation" display screen, its own communication terminal additionally perform its collating operation to collate the user ID received as attached to the command 'connection request' with the user ID entered by its own user. When finding a coincidence between the both user IDs, the communication terminal goes to the step 46; whereas, when failing to find a coincidence therebetween, the communication terminal goes to the step 58.

Figure 17:
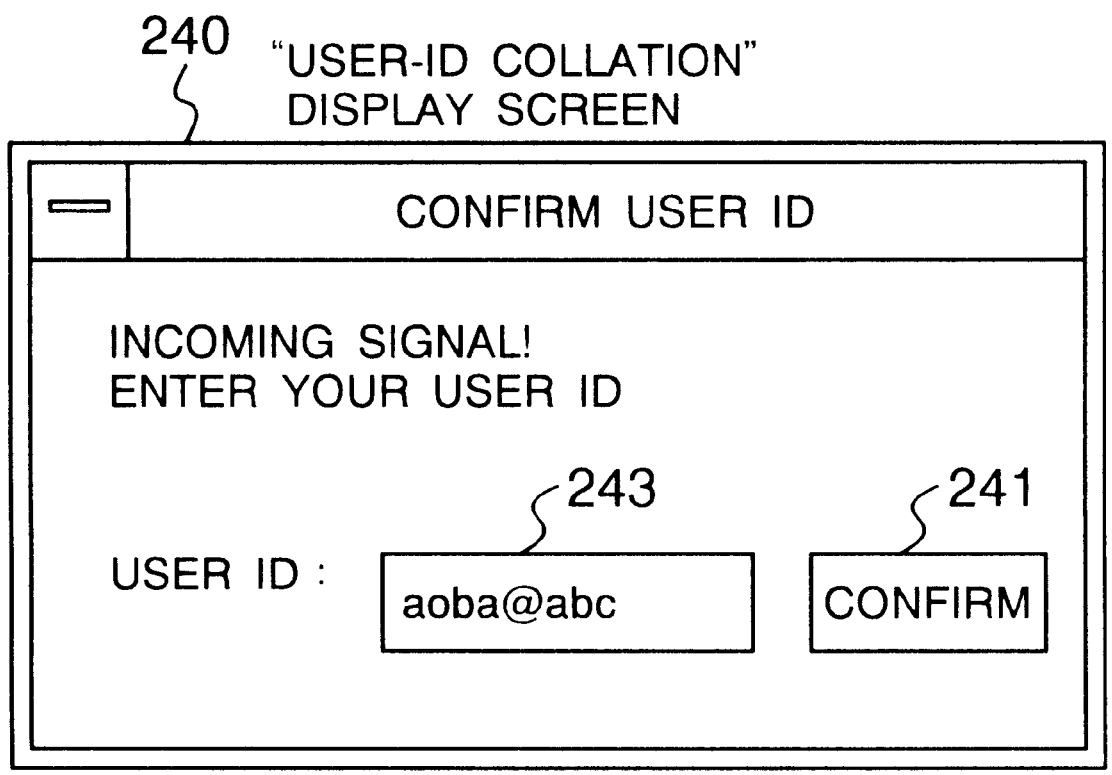
FIG. 17 is a diagram showing an example of an "Inputting User-ID" display screen.

The "User-ID Collation" display screen may be, for example, as shown in FIG. 17. In the drawing, reference numeral 240 denotes a "User-ID Collation" display screen, numeral 243 denotes a user-ID input field 243 in which its own user can input its own user ID, and 241 denotes an "OK" button 241 with which its own user can instruct that the user ID entered in the user-ID input field 243 is used as the user ID in the collating operation.

As has been explained above, in the communication system of the fifth embodiment, the certification information (user ID) for certification of the user who asked the reply communication is used so that, when receiving the incoming signal based on the reply communication from the other communication terminal 1000, the originator communication terminal 1000 can judge whether or not the incoming signal is from the communication terminal 1000 of the party user with who the originator user wanted on the certification information received therefrom and attached to the command 'connection request', with the result that, the originator communication terminal 1000 can accept only the right incoming signal based on the reply communication from the right destination communication terminal, thus preventing the other incoming signals unnecessary for the originator user.

In the communication system of the fifth embodiment, in particular, the terminal address allocated to the communication terminal 1000 is not changed but this is effective even when the user is shifted at the time points of asking the reply communication and receiving the incoming signal based on the reply communication.

In the communication systems of the above fourth and fifth embodiments, the user ID is stored in the outgoing file 6210, so that when the communication terminal 1000, before sending a command to the communication terminal 1000 corresponding to the party terminal address stored in the outgoing file 6210 or performing its reply communication, informs its own user of the user ID stored in the outgoing file 6210, its own user can confirm the user of the communication terminal 1000 of the communication destination or reply-communication destination.

In particular, at the time of the reply communication, its own user can confirm whether or nor its own communication terminal performs the reply communication to the communication terminal 1000 of the user having the user ID stored in the outgoing file 6210 received as an electronic mail, whereby unnecessary reply communication can be more effectively avoided beforehand.

Explanation will then be made as to a sixth embodiment of the communication terminal wherein its own user can confirm the user of the communication terminal 1000 of the communication destination or reply-communication destination.

The communication system of the sixth embodiment is partly different from that of the foregoing embodiment in the automatic outgoing start process of the automatic outgoing start process portion 6200.

Figure 18:
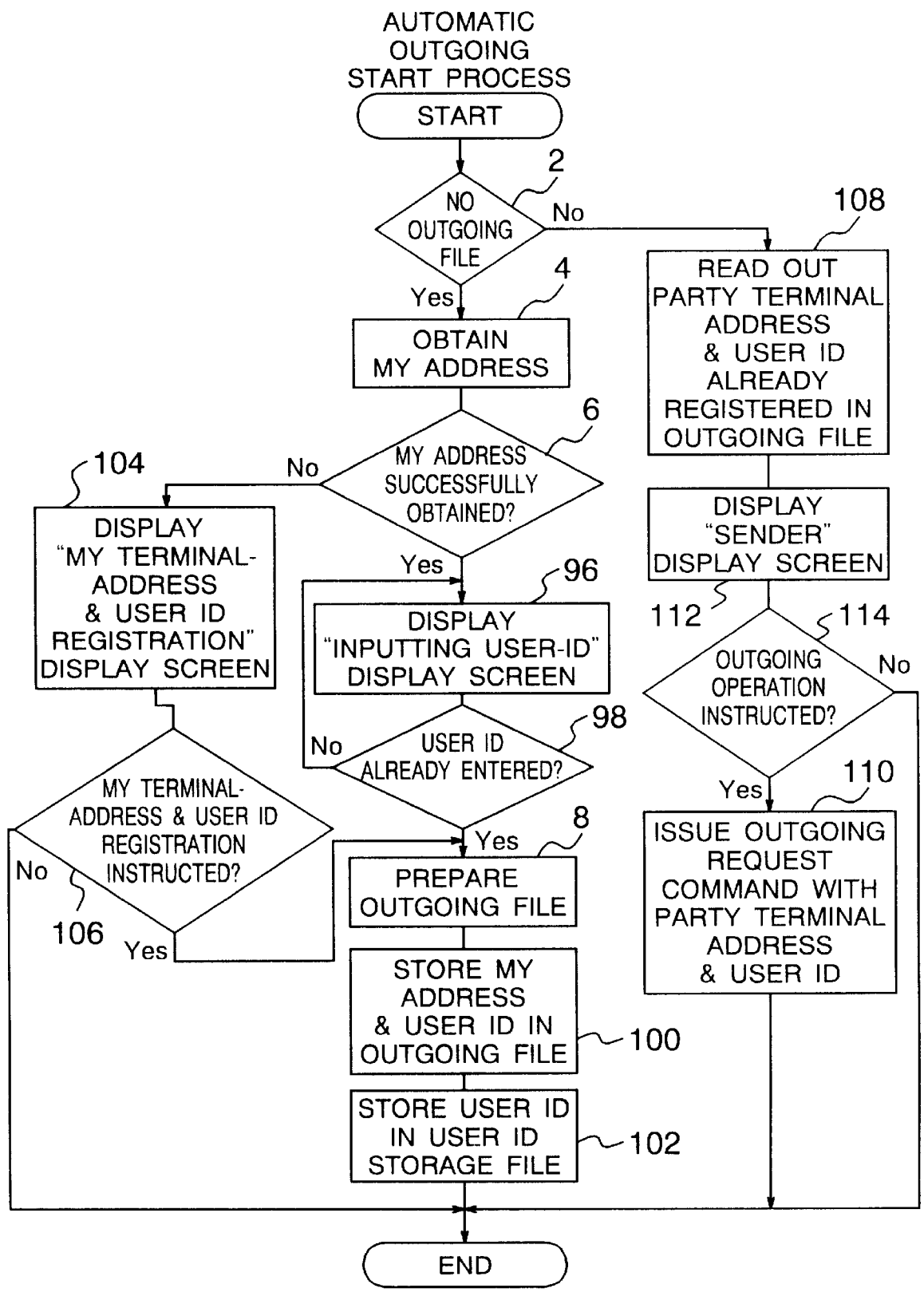
FIG. 18 is a flowchart for explaining an automatic outgoing start process carried out by an automatic outgoing start process portion in a communication system of a sixth embodiment.

FIG. 18 shows a flowchart for explaining the automatic outgoing start process of the automatic outgoing start process portion 6200.

As shown in FIG. 18, the automatic outgoing start process portion 6200 perform the same operations as in the automatic outgoing start operation of FIG. 15 at steps 2, 4, 6, 8, 96, 98, 100, 102, 104, 106, 108 and 110.

In the automatic outgoing start process in the communication system of a six embodiment, the automatic outgoing start process portion 6200, when the automatic outgoing start process is activated as associated with any outgoing file 6210 (step 2), reads out the terminal address (party terminal address) and user ID from the outgoing file 6210 (step 108), and then proceeds to a step 112 to cause its own user to judge whether to perform its outgoing operation to the communication terminal 1000 of the user having the user ID read out from the outgoing file 6210.

More specifically, at the step 112, the communication terminal displays on the display unit a "Sender" display screen to prompt its own user to enter an instruction of whether to perform its outgoing operation to the communication terminal 1000 of the user indicative of the user ID read out from the outgoing file 6210.

The "Sender" display screen may be, for example, as shown in FIG. 19. In the drawing, reference numeral 500 denotes a "Sender" display screen, 503 denotes a "User-ID indication field in which the user ID read out from the outgoing file 6210 is indicated, 501 denotes a "Send" button with which its own user instructs to communicate with the communication terminal 1000 of the user having the user ID indicated in the "User-ID indication field 503, and 502 denotes a "Cancel" button with which its own user instructs not to communicate with the communication terminal 1000 of the user having the user ID indicated in the "User-ID indication field 503.

When its own user instructs to communicate with the communication terminal 1000 of the user indicative of the user ID indicated in the "User-ID indication field 503 by clicking the mouse on the "Send" button 501 in the "Sender" display screen 500 (step 114), the communication terminal 1000 proceeds to the step 110 to prepare the outgoing request command 7000 having the party terminal address and user ID read out from the outgoing file 6210 set therein and to issue the outgoing request command 7000 to the communication control portion 5000. When its own user instructs not to communicate with the communication terminal 1000 of the user indicative of the user ID indicated in the "User-ID indication field 503 by clicking the mouse on the "Cancel" button 502 in the "Sender" display screen 500 (step 14), the communication terminal 1000 performs its operation.

As has been explained above, in the communication system of the sixth embodiment, the user of the communication terminal 1000 can confirm whether or not the user of the communication terminal 1000 of the communication destination or reply-communication destination is correct on the basis of the user ID indicated on the "Sender" display screen 500 and can enter an instruction of whether to perform its outgoing operation or reply communication, whereby outgoing signals unnecessary for its own user can be prevented.

In the communication system of the sixth embodiment, in particular, the communication terminal 1000 which received the outgoing file 6210 as its electronic mail can beforehand prevent its unnecessary reply communication more effectively.

Although the "Sender" display screen 500 is designed to indicate user ID in the communication system of the sixth embodiment, the display screen can further indicate user information on the user of the user ID by utilizing the mail address management file 6310 stored in the storage device 1600.

Explanation will next be made as to a seventh embodiment of the communication system wherein user ID is indicated in the "Sender" display screen 500.

As has been explained above, the mail address management file 6310 contains at least one set of address information each including one set of address information of a user ID as the address of an electronic mail and such user information as the name and department of the user.

Shown in FIG. 20 is an example of structure of the mail address management file 6310. In the drawing, reference symbol 6310a denotes a user-ID field for storage of the user ID as the address of the electronic mail therein, and 6310b to 6310d denote user information fields for storage of information on the user indicative of the user ID stored in the user-ID field 6310a.

In the example of FIG. 20, the user information fields include a name field 6310b for storage of the name of the user, a organization field 6310c for storage of the organization of the user, and a department field 6310d for storage of the department of the organization of the user.

In the communication system of the seventh embodiment, when the user ID coinciding with the user ID stored in the outgoing file 6210 is stored in the user-ID field 6310a in the mail address management file 6310, user information on the user-ID field 6310a as well as user information (name, organization and department, in this example) respectively stored in the user information fields 6310b to 6310d are indicated on the "Sender" display screen 500.

In the case of the communication system of the seventh embodiment, more in detail, when the automatic outgoing start process of the automatic outgoing start process of FIG. 18 is activated as associated with any outgoing file 6210 (step 2), its own communication terminal reads out the terminal address (party terminal address) and user ID stored in the outgoing file 6210 (step 108), and then displays at the step 112 the "Sender" display screen 500 on the display unit to prompt its own user to enter the user ID read out from the outgoing file 6210, the user information associated with the user ID, and an instruction of whether to communicate with the communication terminal 1000 of the user indicative of the user ID.

More specifically, at the step 112, the automatic outgoing start process portion 6200 examines whether or not the user ID coinciding with the user ID read out at the step 108 is stored in the user-ID field 6310a of the mail address management file 6310. When successfully finding the user ID, the automatic outgoing start process portion 6200 reads out the name stored in the name field 6310b, the organization stored in the organization field 6310c and the department stored in the department field 6310d, associated with the user-ID field 6310a having the user ID stored therein respectively, and then displays the read-out name, organization and department on the "Sender" display screen 500.

Figure 21:
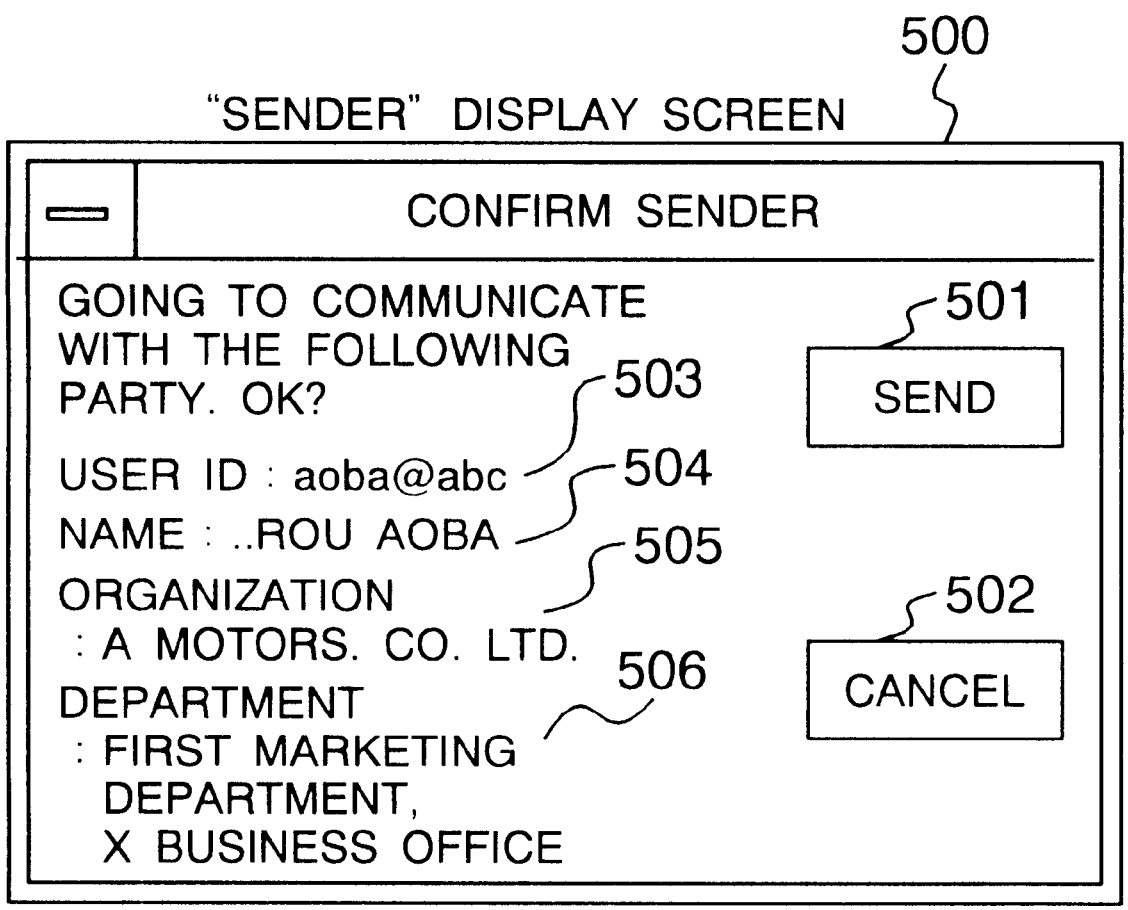
FIG. 21 shows another example of the "Sender" display screen.

The "Sender" display screen 500 may be, for example, as shown in FIG. 21. In the drawing, reference numeral 504 denotes a name field indicative of the name read out from the name field 6310b associated with the user-ID field 6310a in which the user ID indicated in the "User-ID indication field 503 is stored, 505 denotes an organization indication field indicative of the organization read out from the organization field 6310c associated with the user-ID field 6310a in which the user ID indicated in the "User-ID indication field 503 is stored, 506 denotes a department indication field indicative of the department read out from the department field 6310d associated with the user-ID field 6310a in which the user ID indicated in the "User-ID indication field 503 is stored.

As has been explained above, in the communication system of the seventh embodiment, the user of the communication terminal 1000 can confirm whether or not the user of the communication terminal 1000 of the communication destination or reply-communication destination is correct on the basis of the user ID and user information indicated on the "Sender" display screen 500 and can enter an instruction of whether to perform its outgoing operation or reply communication, whereby outgoing signals unnecessary for its own user can be prevented.

In the communication system of the seventh embodiment, in particular, the communication terminal 1000 which received the outgoing file 6210 as its electronic mail can beforehand prevent its unnecessary reply communication more effectively.

The communication system of the above seventh embodiment is designed so that the communication terminal 1000 utilizes the mail address management file 6310 stored in the storage device 1600 to inform its own user of user information about the user indicative of the user ID. However, another way to utilize the mail address management file 6310 is considered, which will be explained below.

That is, in the communication terminal 1000, its own user is considered to be very familiar to the user of the user ID stored in the user-ID field 6310a of the mail address management file 6310. Thus, if its own user is very familiar to the user of the user ID stored in the outgoing file 6210, then the communication terminal 1000 can cause no appearance of such a "Sender" display screen 500 as shown in FIG. 21; whereas, only if not, then the communication terminal 1000 can cause appearance of such a "Sender" display screen 500 as shown in FIG. 19.

Explanation will then be made as to an eighth embodiment of the communication system wherein the "Sender" display screen 500 appears on the display unit only when the user ID stored in the outgoing file 6210 is not stored in the user-ID field 6310a of the mail address management file 6310.

The communication system of the eighth embodiment is partly different from that of the foregoing embodiment in the automatic outgoing start process of the automatic outgoing start process portion 6200.

Figure 22:
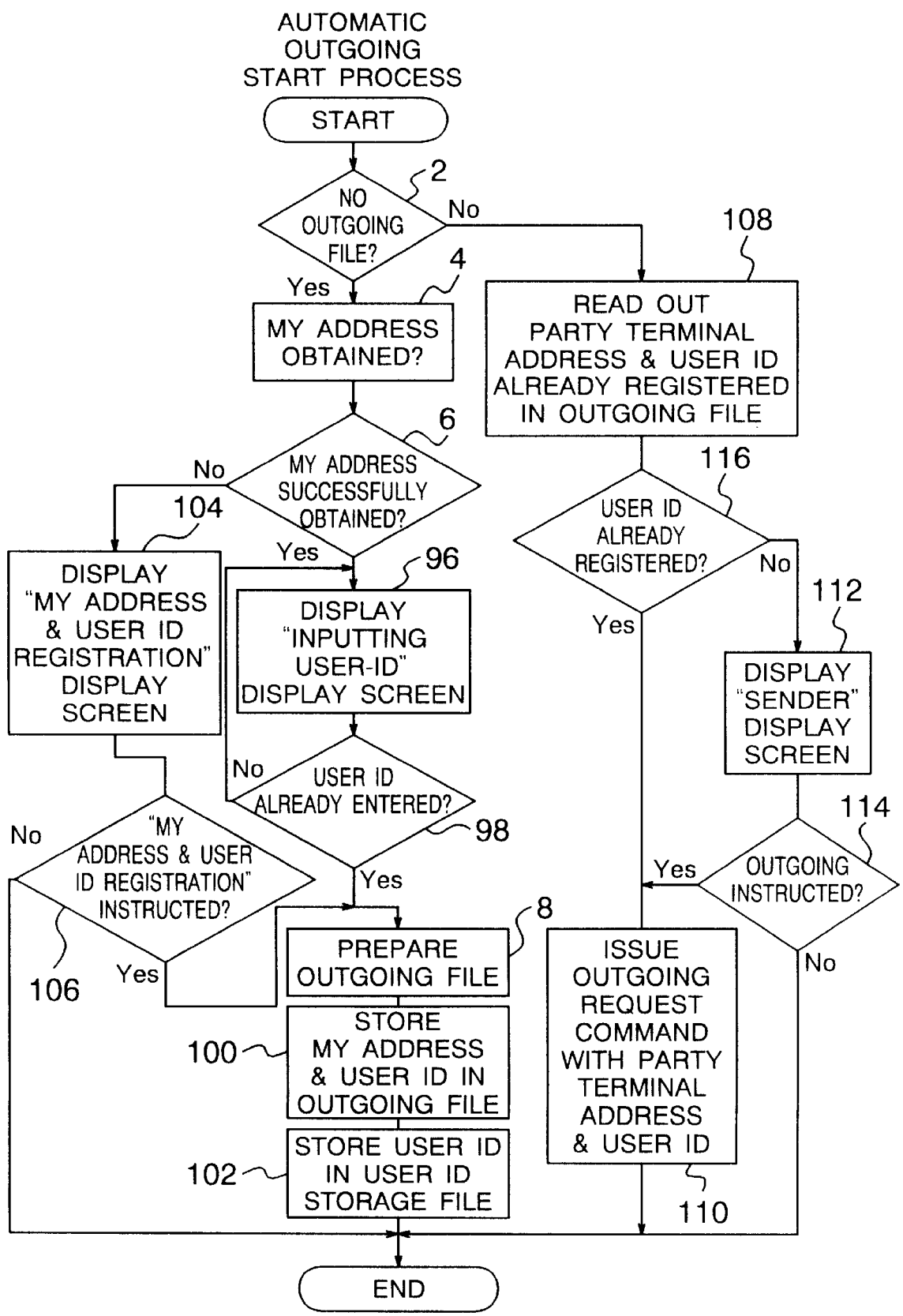
FIG. 22 is a flowchart for explaining an automatic outgoing start process carried out by an automatic outgoing start process portion in a communication system of an eighth embodiment.

FIG. 22 shows a flowchart for explaining the automatic outgoing start process of the automatic outgoing start process portion 6200.

As shown in FIG. 22, the automatic outgoing start process portion 6200 perform the same automatic outgoing start process as in FIG. 18 at steps 2, 4, 6, 8, 96, 98, 100, 102, 104, 106, 108, 110, 112 and 114.

However, in the automatic outgoing start process of the communication system of the eighth embodiment, the automatic outgoing start process portion 6200, when the automatic outgoing start process is activated as associated with any outgoing file 6210 (step 2), reads out the terminal address (party terminal address) and user ID stored in the outgoing file 6210 (step 108), and subsequently examines whether or not the user ID coinciding with the read-out user ID is stored in the user-ID field 6310a of the mail address management file 6310 (step 116).

When the automatic outgoing start process portion 6200 successfully finds the user ID in the user ID field, its own user is considered to be very familiar to the user who asked the reply communication or to the user of the communication terminal 1000 of the communication destination. Thus, the automatic outgoing start process proceeds to the step 110 to prepare the outgoing request command 7000 having the party terminal address and user ID read out from the outgoing file 6210 set therein and to issue the command 7000 to the communication control portion 5000. When the automatic outgoing start process portion 6200 fails to find the user ID in the user ID field, such a situation is considered that its own user does not know the user whom he asked the reply communication. In which case, the automatic outgoing start process proceeds to the step 112 to cause appearance of the "Sender" display screen 500 of FIG. 19 on the display unit.

As has been explained above, in the communication terminal 1000 of the communication system of the eighth embodiment, when the user ID coinciding with the user ID stored in the outgoing file 6210 is stored in the user-ID field 6310a of the mail address management file 6310, the operation of its own user for the purpose of confirming the communication party can be omitted.

In other words, this means that, especially in the reply communication mode of the communication terminal 1000, when the user ID coinciding with the user ID stored in the outgoing file 6210 received as its electronic mail is not stored in the user-ID field 6310a of the mail address management file 6310, that is, only when its own user is possibly asked to perform the reply communication by an unknown party, its own user can be required to confirm the user as the reply communication asker, thus enabling previous and quick prevention of the reply communication unnecessary for unknown party.

In the communication systems of the above sixth to eighth embodiments using the user ID as the certification information, the communication terminal 1000 displays the "Sender" display screen 500 on the display unit in order to inform at least its own user of the user ID stored in the outgoing file 6210. However, even in communication systems of types wherein only the party terminal address is stored in the outgoing file 6210 and the password is used as the certification information, the communication terminal 1000 can display the "Sender" display screen on the display unit prior to the communication or reply communication to the communication terminal 1000 corresponding to the party terminal address stored in the outgoing file 6210. In the latter case, information to be displayed on the "Sender" display screen may be arbitrary as far as the information are available on the basis of the outgoing file 6210 specified as associated with the start time of the automatic outgoing start process of the automatic outgoing start process portion 6200.

In the communication systems of all the foregoing embodiments, the explanation has been made on the assumption that the single user transmits the outgoing file 6210 as its electronic mail. However, the single user can transmit the same outgoing file 6210 as an electronic mail directed to a plurality of users, or a list of address information stored in the mail address management file 6310 can be displayed on the display unit and the user can transmit the same outgoing file 6210 as an electronic mail addressed to one or more users with use of one or more user IDs specified by its own user in the displayed list.

Further, the communication systems of all the foregoing embodiments are arranged so that the outgoing file 6210 stored in the storage device 1600 by the automatic outgoing start process portion 6200, when the user of the communication terminal 1000 activates the electronic-mail send/receive process, is transmitted by the electronic-mail send/receive process portion via the other-media communication control portion 5500 to the mail server 2000 as the electronic mail directed to the desired party user. However, such an arrangement may be possible that the automatic outgoing start process portion 6200, after storing the outgoing file 6210 in the storage device 1600, immediately activates the electronic-mail send/receive process to thereby inform the party user of the latest own terminal address.

Explanation will next be made as to an ninth embodiment of the communication system wherein the automatic outgoing start process portion 6200 activates the electronic-mail send/receive process.

The communication system of the ninth embodiment is partly different from that of the foregoing embodiment in the automatic outgoing start process of the automatic outgoing start process portion 6200.

Figure 23:
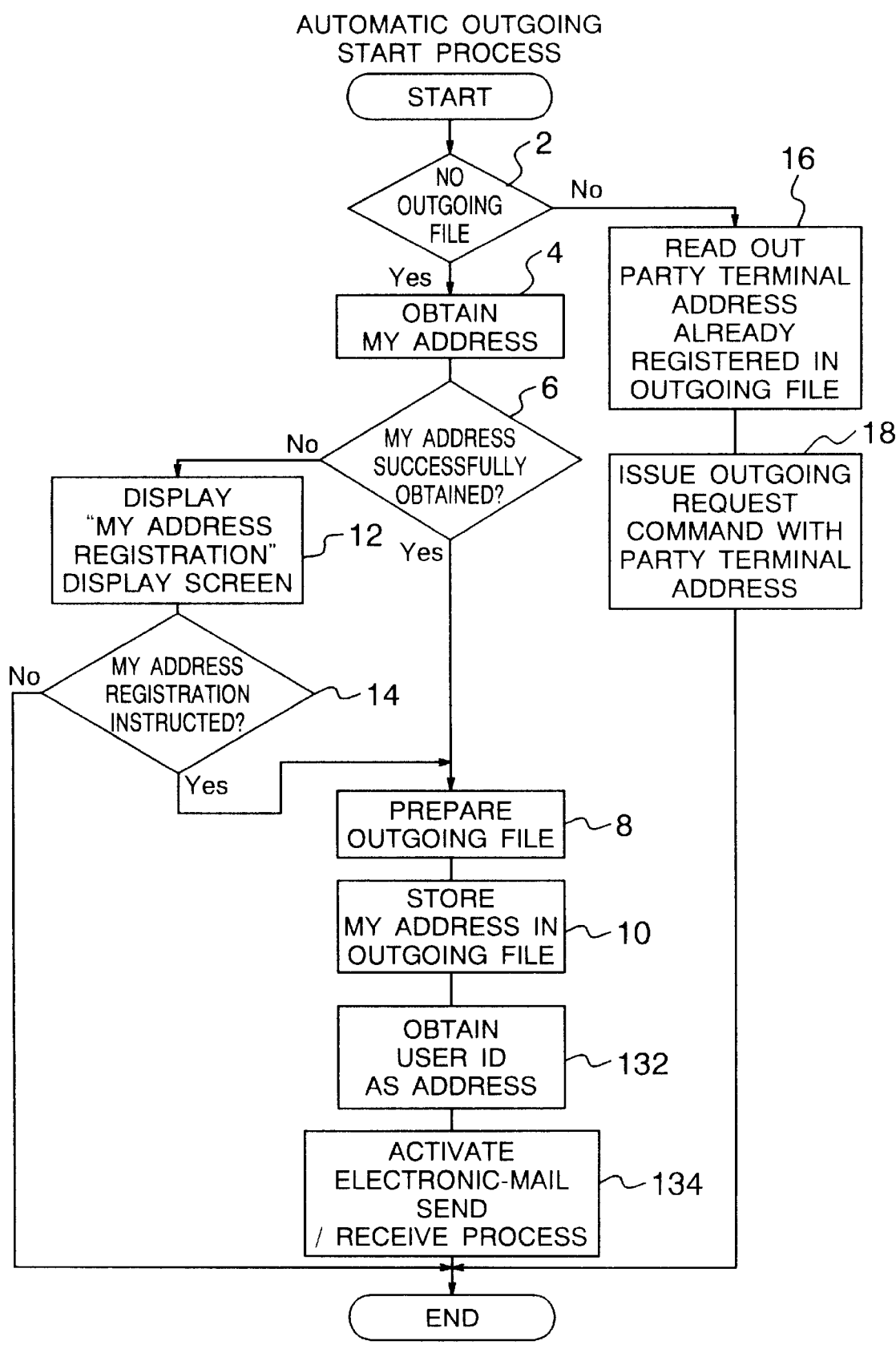
FIG. 23 is a flowchart for explaining an automatic outgoing start process carried out by an automatic outgoing start process portion in a communication system of a ninth embodiment.

Referring to FIG. 23, there is shown a flowchart for explaining the automatic outgoing start process carried out by the automatic outgoing start process portion 6200.

As shown in FIG. 23, the automatic outgoing start process portion 6200 performs the same automatic outgoing start process as in FIG. 6 at steps 2, 4, 6, 8, 10, 12, 14, 16 and 18.

However, in the automatic outgoing start process of the communication system of the ninth embodiment, the automatic outgoing start process portion 6200, after storing its own terminal address in the outgoing file 6210 and storing the outgoing file 6210 in the storage device 1600 (step 10), prompts its own user to enter the user ID of the user corresponding to the transmission address of the outgoing file 6210 as its electronic mail, that is, the user ID of the party user with who its own user wants to communicate. When its own communication terminal gets the user ID entered by its own user (step 132), the communication terminal activates the electronic-mail send/receive process (step 134) to send the outgoing file 6210 stored in the storage device 1600 at the step 10 to the mail server 2000 as the electronic mail having the user ID as its address obtained at the step 132.

As has been explained in the foregoing, with the communication system of the ninth embodiment, the automatic outgoing start process portion 6200 of the communication terminal 1000, when preparing the outgoing file 6210 its own terminal address stored therein and storing the outgoing file 6210 in the storage device 1600, activates the electronic-mail send/receive process, with the result that the communication terminal 1000 can transmit the outgoing file 6210 stored in the storage device 1600 to the desired party user as an electronic mail, thus enabling quick notification of the party user about the latest own terminal address.

With the communication system of the ninth embodiment, when the electronic-mail send/receive process of the electronic-mail send/receive process portion is activated by the automatic outgoing start process portion 6200, the operation of the step 132 in the automatic outgoing start process of FIG. 23 can become unnecessary if its own user can enter the user ID of the user corresponding to the address of the electronic mail.

With the communication system of the ninth embodiment, at the step 132 in the automatic outgoing start process of FIG. 23, the automatic outgoing start process portion 6200 can not only obtain the user ID entered by its own user but can also display, e.g., a list of address information stored in the mail address management file 6310 and can obtain one or more user IDs specified by its own user from the list. In this way, the communication terminal can send the same outgoing file 6210 as an electronic mail directed to one or more users.

Explanation will be made as to the detailed operation of the communication terminals 1000 in the aforementioned example, by referring to FIG. 24.

Explanation will now be made in connection with a sequence diagram when the user A of the communication terminal 1000a does not know the terminal address of the communication terminal 1000b of the user B and the terminal address of the communication terminal 1000c of the user C as communication destinations and asks the users B and C the reply communication. It is now assumed that the communication terminal 1000a has a terminal address "1.2.3.4.".

Figure 24:
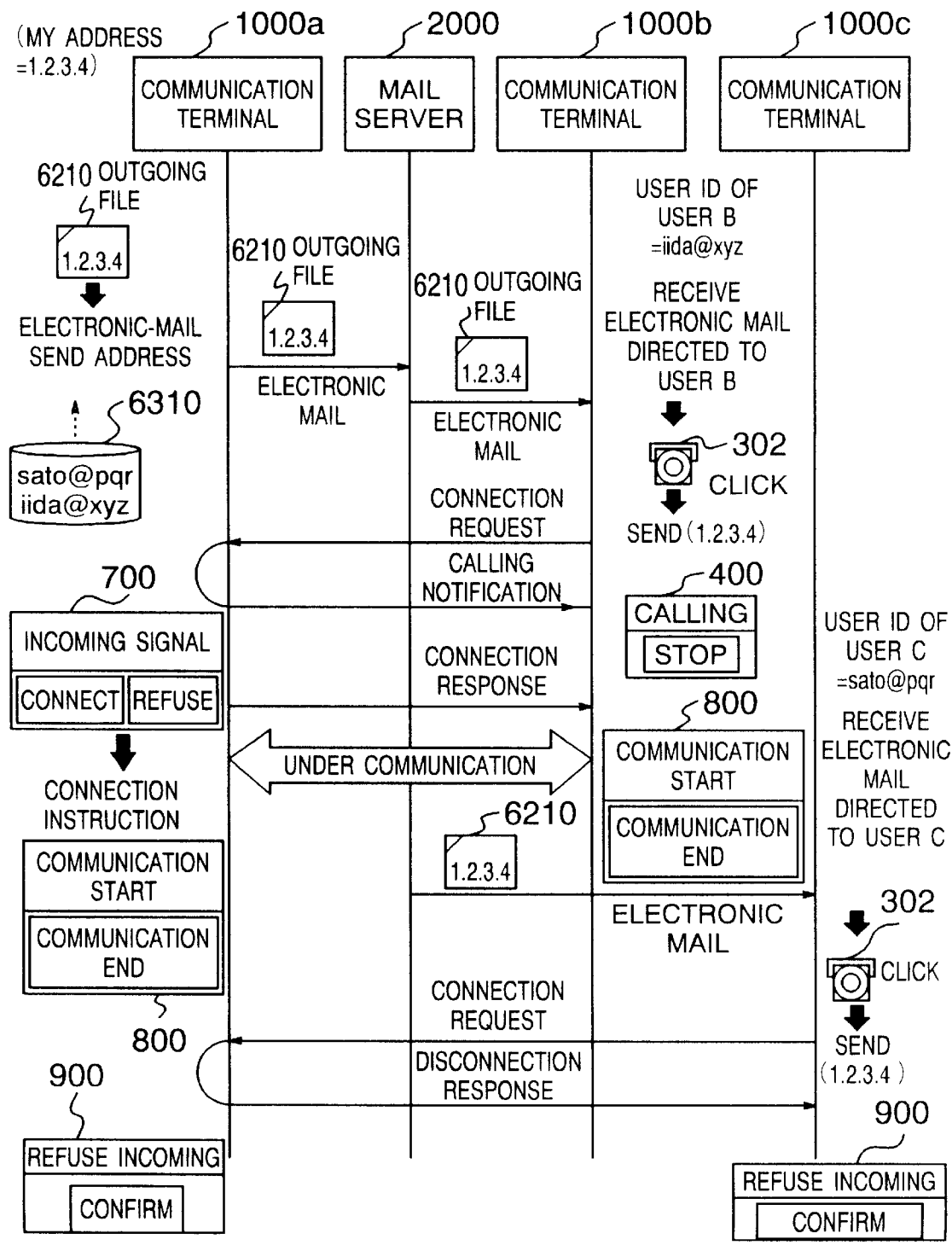
FIG. 24 is a sequence diagram for explaining detailed operations of communication terminals in the communication system of the ninth embodiment.

As shown in FIG. 24, the communication terminal 1000a first obtains its own terminal address "1.2.3.4." and prompts its own user to specify the user IDs of the desired party users (users B and C in this example) on the display screen. When the user B has a user ID "iida@xyz" and the user C has a user ID "sato@pqr" for example, the communication terminal 1000a stores the terminal address "1.2.3.4." in the outgoing file 6210 and stores the outgoing file 6210 in the storage device 1600. Subsequently, the communication terminal 1000a transmits to the mail server 2000 the outgoing file 6210 stored in the storage device 1600 as an electronic mail directed to both the users B and C, with the user IDs "iida@xyz" and "sato@pqr" as its addresses.

Thereafter, the same outgoing file 6210 will be received at the both users B and C as the electronic mail. In this example, it is assumed that the user B receives the outgoing file 6210 faster than the user C.

When the user B receives the electronic mail directed to the user B from the mail server 2000 and the received electronic mail is the outgoing file 6210, this means that the user B is asked to perform the reply communication. Thus, the communication terminal 1000b displays on the display unit the icon 302 with which the user B can instruct its own communication terminal to perform the reply communication to the communication terminal 1000a indicative of the terminal address "1.2.3.4." stored in the outgoing file 6210. A click of the mouse on the icon 302 by the user B causes the automatic outgoing start process to be activated as associated with any outgoing file 6210, so that the outgoing process is activated to cause the communication terminal 1000a to perform its reply communication.

At this time, the communication terminal 1000a gives the "Incoming" display screen 700 on the display unit, while the communication terminal 1000b gives the "Calling" display screen 400 on the display unit.

When the user A enters an instruction to accept the incoming signal in the "Incoming" display screen 700, a communication channel is established between the communication terminals 1000a and 1000b and the users A and B can communicate with each other.

At this time, the "Talking" display screen 800 appears on the display units of the communication terminals 1000a and 1000b.

The communication terminal 1000c of the user C, when receiving the electronic mail directed to the user C from the mail server 2000 in the middle of the communication with the users A and B, performs the reply communication to the communication terminal 1000a like the communication terminal 1000b. However, the communication terminal 1000a is now communicating with the other communication terminal (communication terminal 1000b), so that the communication terminal 1000a, when receiving the command 'connection request' from the communication terminal 100c, cannot return the command 'disconnection response' to the communication terminal 1000c to communicate with the user C.

At this time, an "Incoming be Refused" display screen 900 appears on the display units of the communication terminals 1000a and 1000b.

The communication terminal 1000 may be arranged in the electronic-mail receive process to receive a plurality of electronic mails directed to its own user. To this end, the communication terminal 1000b (or communication terminal 1000c), when receiving a plurality of electronic mails directed to its own user B (or user C), searches its mailing list for the outgoing file 6210 and, when successfully finding the outgoing file 6210, displays the icon 302 on the display unit.

In the communication system of the ninth embodiment, the plural-mail address management file 6310 may be stored in the storage device 1600, in which case the user of the communication terminal 1000 can specify the mail address management file 6310 itself storing therein one or more user IDs as addresses upon transmission of the outgoing file 6210 as the electronic mail. That is, at the step 132 in the automatic outgoing start process portion of FIG. 23, the automatic outgoing start process portion 6200 can obtain the user IDs stored in the mail address management file 6310 specified by its own user.

Assume for example that the communication terminals 1000 are at all times connected by means of private line in the communication system and have terminal addresses statically allocated thereto, each communication terminal can be used as a portable type when disconnected from the private line, and the communication terminals when used as the portable type can have terminal addresses dynamically allocated there. Then the user of the communication terminal

1000, when previously storing in the single-mail address management file 6310 only the user ID of the user to whom its own user is familiar and knows its statically-allocated terminal address, can specify the mail address management file 6310 as the address of the electronic mail and can send the outgoing file 6210 as the electronic mail to inform the familiar user of the latest terminal address.

The communication systems of all the aforementioned embodiments are intended, after the communication terminal 1000 of the user who asked the reply communication sends the outgoing file 6210 as an electronic mail addressed to the desired party user, to wait until the communication terminal 1000 of the party user performs the reply communication. Accordingly, when the same terminal address as the terminal address allocated to the communication terminal 1000 at the time of asking the reply communication is not allocated any longer at the time the communication terminal 1000 of the party user performs the reply communication, the reply communication become wasteful.

In the case where, for example, the communication terminal 1000 of the user who asked the reply communication has a terminal address dynamically allocated thereto at its connection time, not only the terminal address of the communication terminal 1000 so far allocated thereto is removed after completion of the connection but also the terminal address so far allocated thereto may be possibly allocated to the other communication terminal 1000. For this reason, when the communication terminal 1000 of the user who asked the reply communication already completes its connection at the time the communication terminal 1000 of the party user performs the reply communication, there occurs such a situation that the reply communication of the party communication terminal cannot find its correct corresponding communication terminal 1000 or may be carried out with the communication terminal of another wrong user.

In the communication system of the present invention, the communication terminal 1000 of the user who asks the reply communication further stores in the outgoing file 6210 a response limit indicative of a time deadline for accepting the incoming signal based on the reply communication, whereas, the communication terminal 1000 of the party user which received the outgoing file 6210 as its electronic mail performs the reply communication only when the current time does not exceed the response limit stored in the outgoing file 6210 received as the electronic mail, thereby enabling the reply communication accommodating the inconvenient dynamic address allocation of the communication terminal of the reply communication asker.

Explanation will be made as to a tenth embodiment of the communication system wherein the response limit is stored in the outgoing file 6210.

The communication system of the tenth embodiment is partly different from that of the foregoing embodiment in the automatic outgoing start process of the automatic outgoing start process portion 6200.

Figure 25:
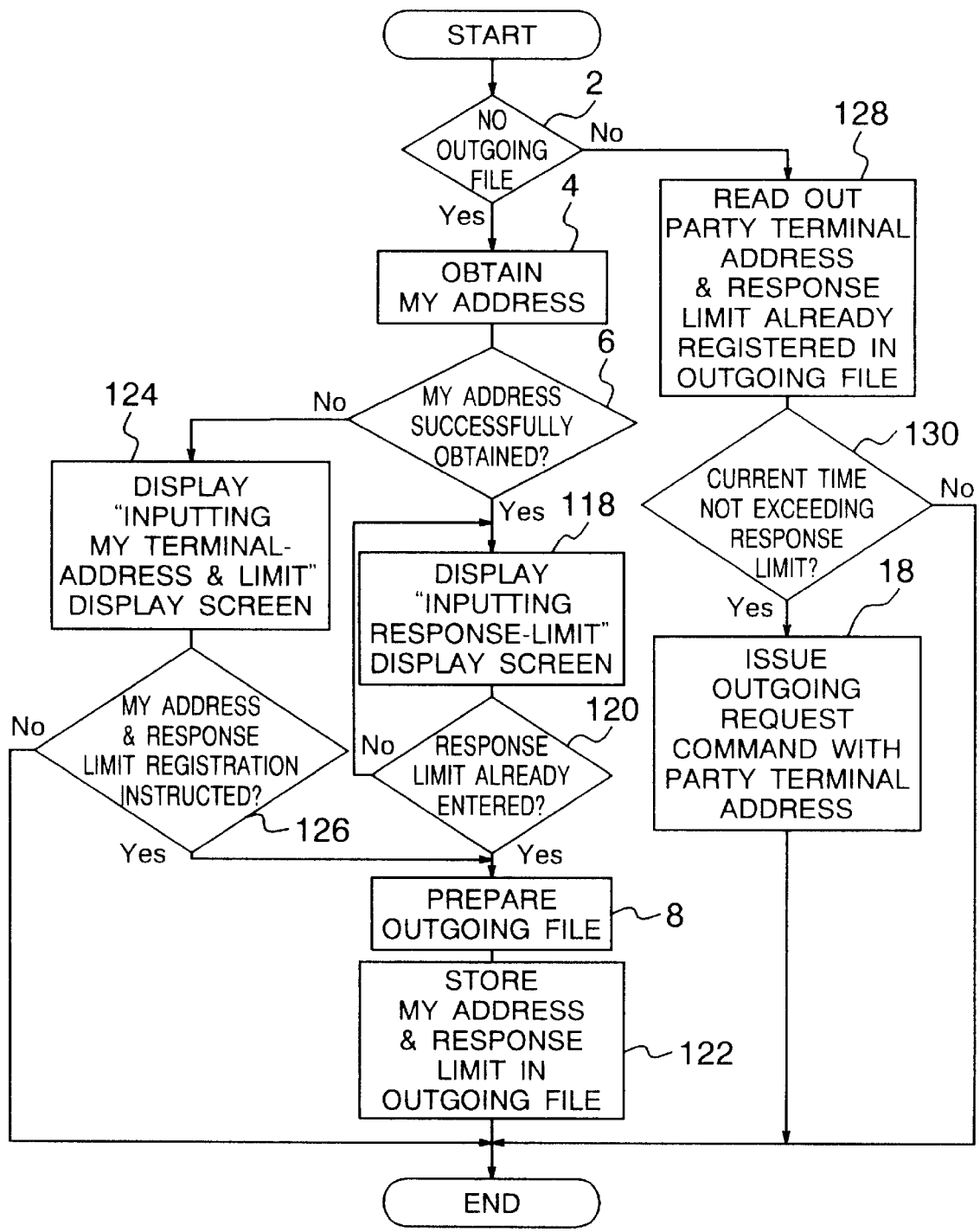
FIG. 25 is a flowchart for explaining an automatic outgoing start process carried out by an automatic outgoing start process portion in a communication system of a tenth embodiment.

Shown in FIG. 25 is a flowchart for explaining the automatic outgoing start process of the automatic outgoing start process portion 6200.

As shown in FIG. 25, the automatic outgoing start process portion 6200 performs the same automatic outgoing start process as in FIG. 6 at steps 2, 4, 6, 8 and 18.

In the automatic outgoing start process in the communication system of the tenth embodiment, however, the automatic outgoing start process portion 6200, when successfully getting its own terminal address (step 6), proceeds to a step 118 and displays an "Inputting Response-Limit" display screen on the display unit to prompt its own user to enter the response limit indicative of the acceptance limit of the incoming signal based on the reply communication.

When its own user enters the response limit in the "Inputting Response-Limit" display screen (step 120), the communication terminal proceeds to the step 8 to prepare the outgoing file 6210, store its own terminal address and response limit in the outgoing file 6210 and store the file in the storage device 1600 (step 122).

When failing to get its own terminal address (step 6), the communication terminal proceeds to a step 124 to prompt its own user to enter its own terminal address and response limit to be stored in the outgoing file 6210.

At the 124, more specifically, the communication terminal displays a "Inputting My Terminal-Address & Response Limit" display screen on the display unit to prompt its own user to enter its own terminal address and response limit as well as an instruction indicative of whether to store the own terminal address and response limit in the outgoing file 6210.

When its own user enters its own terminal address and response limit and then enters an instruction indicative of registering the own terminal address and response limit in the outgoing file 6210 in the "Inputting My Terminal-Address & Limit" display screen (step 126), the communication terminal goes to the step 8 to prepare the outgoing file 6210. When its own user enters an instruction of not registering the own terminal address and response limit in the outgoing file 6210 in the "Inputting My Terminal-Address & Limit" display screen (step 126), the communication terminal terminates its operation.

The communication system of the tenth embodiment is arranged to store its own terminal address and response limit in the outgoing file 6210 in this way. Thus, the automatic outgoing start process portion 6200, when the automatic outgoing start process is activated as associated with the specification of any outgoing file 6210 (step 2), reads out the terminal address (party terminal address) and response limit stored in the outgoing file 6210 associated with the start time of the automatic outgoing start process (step 128), and judges whether or not the current time exceeds the response limit read out at the step 128 (step 130). When the current time exceeds the read-out response limit, the automatic outgoing start process goes to a step 18 to prepare the outgoing request command 7000 setting therein the party terminal address read out at the step 128 and to issue the command to the communication control portion 5000.

Explanation will be made as to the detailed operations of the communication terminals 1000 in the communication system of the tenth embodiment, by referring to FIG. 26.

Explanation will now be directed to a sequence when the user A of the communication terminal 1000a does not know the terminal address of the communication terminal 1000b of the user B and asks the user B the reply communication. It is assumed in this case that the communication terminal 1000a has a terminal address "1.2.3.4.".

Figure 26:
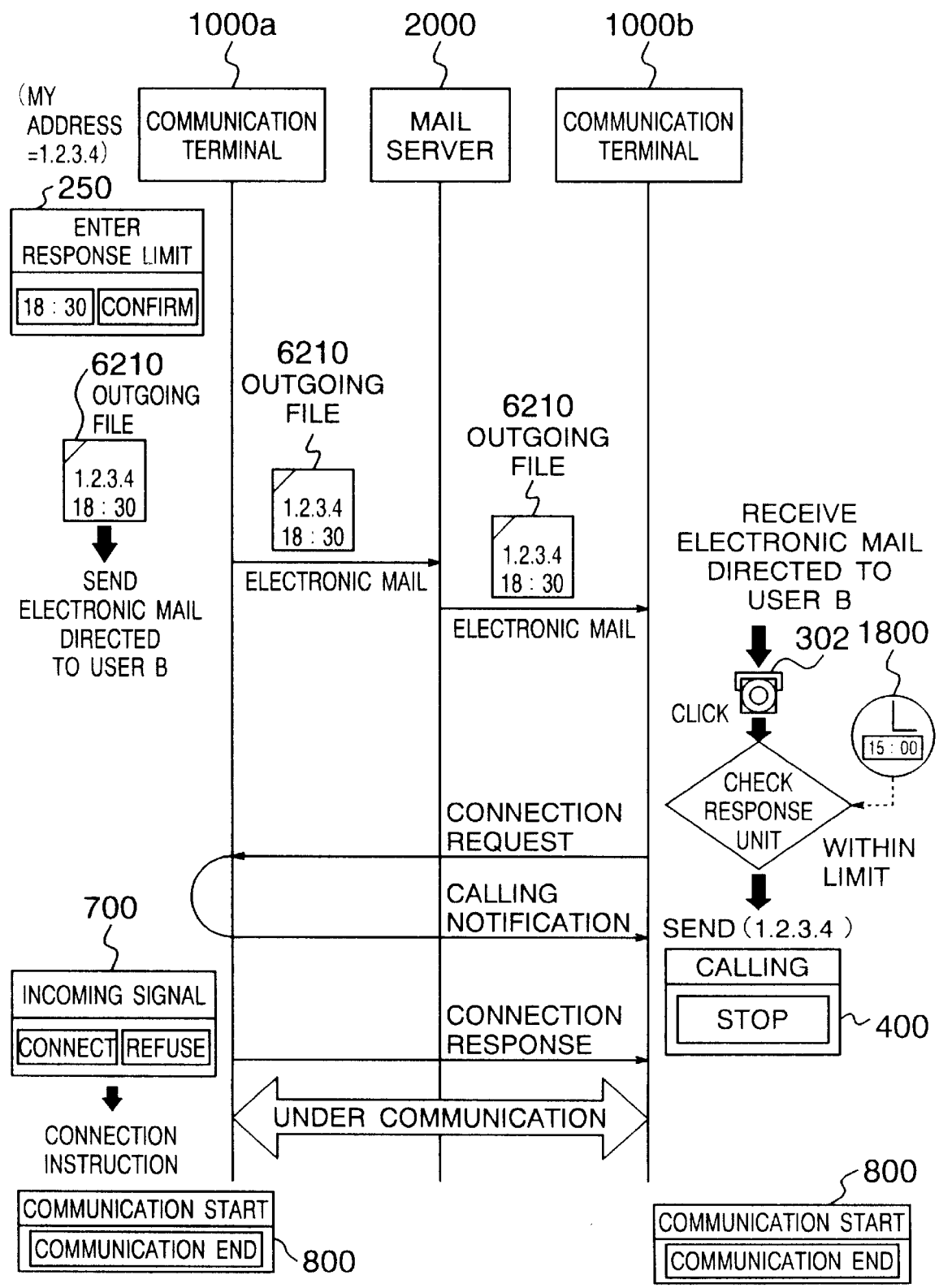
FIG. 26 is a sequence diagram for explaining detailed operations of communication terminals in the communication system of the tenth embodiment.

As shown in FIG. 26, the communication terminal 1000a first obtains its own terminal address "1.2.3.4." and prompts its own user to enter a response limit on an "Inputting Response-Limit" display screen 250. Assuming that its own user enters a response limit of, e.g., "18:30", then the communication terminal 1000a stores in the outgoing file 6210 the obtained own terminal address "1.2.3.4." and the response limit "18:30" entered by its own user and stores the outgoing file 6210 in the storage device 1600. Subsequently, the communication terminal 1000a transmits the outgoing file 6210 stored in the storage device 1600 to the mail server 2000 as an electronic mail addressed to the user B.

When the user B receives the electronic mail directed to the user B from the mail server 2000 and the received electronic mail is the outgoing file 6210, this means that the communication terminal 1000*b* is asked the reply communication. Thus the communication terminal 1000*b* displays the icon 302 on the display unit to prompt the user B to instruct its own communication terminal 1000*b* to perform the reply communication to the communication terminal 1000*a* indicative of its own terminal address "1.2.3.4." stored in the outgoing file 6210. When the user B clicks the mouse on the icon 302, the automatic outgoing start process is activated as associated with any outgoing file 6210. In the communication system of the tenth embodiment, as has been explained above, the automatic outgoing start process portion 6200 judges whether or not the current time (15:00 for example) timed by a timer 1800 exceeds the response limit "18:00" stored in the outgoing file 6210. At this time, since the current time "15:00" does not exceed the response limit "18:00", the outgoing process is activated to perform the reply communication to the communication terminal 1000*a*.

At this time, the "Incoming" display screen 700 appears on the display unit in the communication terminal 1000*a*, while the "Calling" display screen 400 appears on the display unit in the communication terminal 1000*b*.

When the user A enters a connection instruction of accepting the incoming signal on the "Incoming" display screen 700, a communication channel is established between the communication terminals 1000*a* and 1000*b* and communication between the users A and B is enabled.

At this time, the "Talking" display screen 800 appears on the display units of the communication terminals 1000*a* and 1000*b*.

The communication terminal 1000 may receive a plurality of electronic mail directed to its own user and display on the display unit a mailing list including these electronic mails. To this end, the communication terminal 1000*b*, when receiving a plurality of electronic mails directed to its own user B, searches the mailing list for the outgoing file 6210 and, when successfully finding the outgoing file 6210, displays the icon 302 on the display unit.

In FIG. 26, the "Inputting Response-Limit" display screen 250 corresponds to the "Inputting Response-Limit" display screen displayed on the display unit at the step 118 of the automatic outgoing start process of FIG. 25.

As has been explained in the foregoing, in the communication system of the tenth embodiment, the user of the communication terminal 1000, when asking the reply communication to the desired party user, informs the party user of the response limit indicative of an acceptance limit of the incoming signal based on the reply communication. Thus, when the current time at the time of the reply communication exceeds the response limit, the communication terminal 1000 of the party user does not perform the reply communication, thereby preventing the reply communication at the inconvenient time for the reply-communication asker or unnecessary reply communication to the communication terminals other than the reply-communication asker.

Although the communication systems of all the aforementioned embodiments have been arranged so that the user of the communication terminal 1000 sends the outgoing file 6210 as an electronic mail addressed to the desired party user to thereby ask the party user the reply communication, the present invention is not limited to the specific example. For example, such an arrangement may be possible that the document file 6110 including the outgoing file 6210 is transmitted as an electronic mail directed to the desired party user to thereby ask the party user the reply communication.

Explanation will then be made as an eleventh embodiment of the communication system wherein the document file 6110 including the outgoing file 6210 is transmitted as an electronic mail directed to a party user.

The communication system of the eleventh embodiment is arranged so that the icon 302 is prepared for activating the automatic outgoing start process as associated with any outgoing file 6210, the user of the communication terminal 1000 activates the document edit process of a document edit process portion 6100 under such a condition that the outgoing file 6210 is already stored in the storage device 1600, whereby the contents of any document file 6110 is displayed on the display unit in the form of a document display screen and pastes the icon 302 on the document display screen, and, when terminating the document edit process, the communication terminal 1000 stores in the document file 6110 the outgoing file 6210 stored in the storage device 1600 and then stores the document file 6110 in the storage device 1600.

The user of the communication terminal 1000, when receiving the document file 6110 including the outgoing file 6210 as an electronic mail, activates the document edit process of the document edit process portion 6100, whereby the communication terminal displays on the display unit the contents of the document file 6110 received as the electronic mail as the document display screen. Since the document display screen has the icon 302 already pasted thereon, when the user clicks the mouse on the icon 302, he can instruct the communication terminal to perform the reply communication to the originator communication terminal.

Explanation will next be made as to the detailed operation of the communication terminals 1000 in the communication system of the eleventh embodiment, by referring to FIG. 27.

Explanation will be directed to a sequence when the user A of the communication terminal 1000*a* does not know the terminal address of the communication terminal 1000*b* of the user B with whom the user A wants to communicate and asks the user B the reply communication. It is in this example assumed that the communication terminal 1000*a* has a terminal address "1.2.3.4.".

Figure 27:
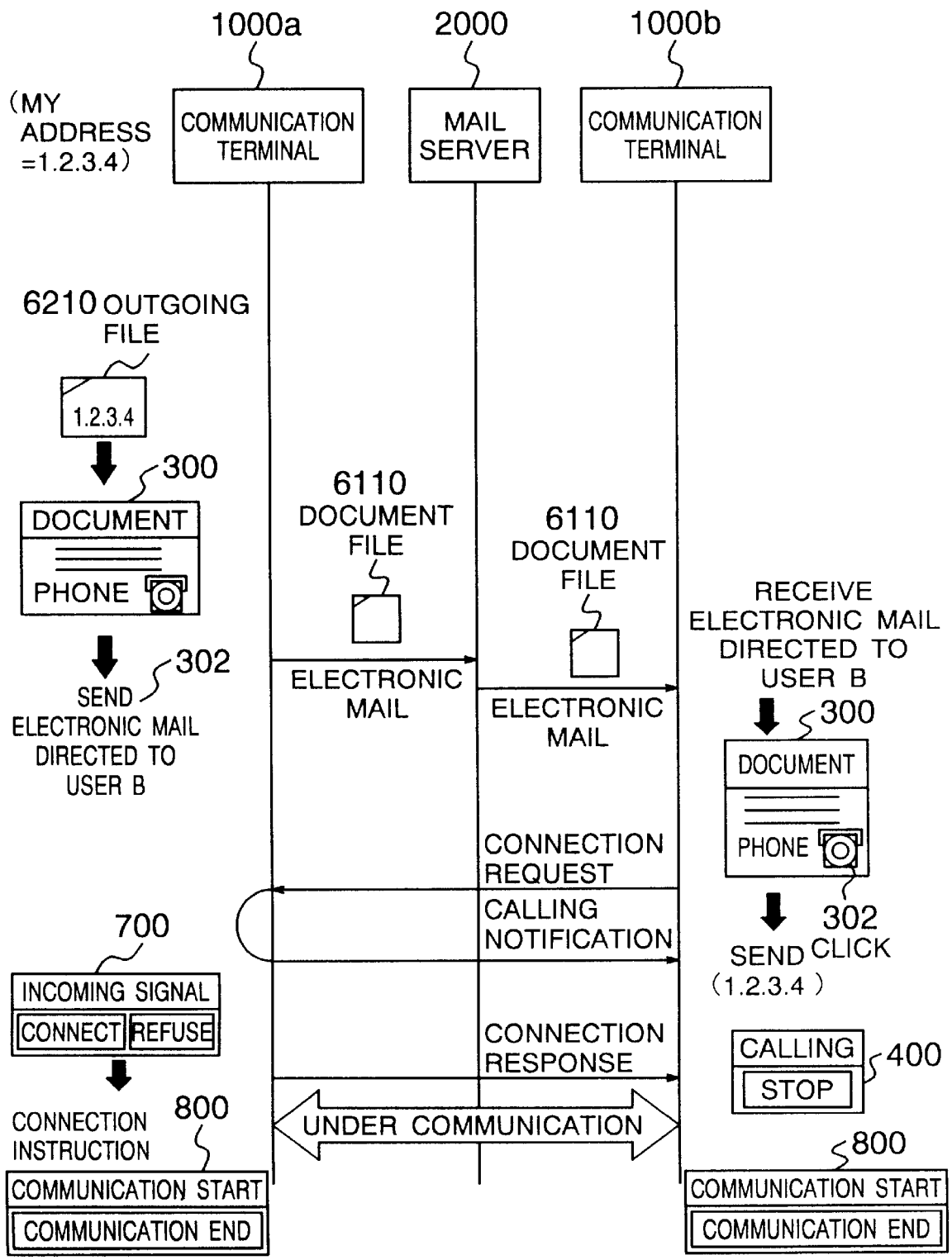
FIG. 27 is a sequence diagram for explaining detailed operations of communication terminals in a communication system of an eleventh embodiment.

As shown in FIG. 27, the communication terminal 1000*a* first obtains its own terminal address "1.2.3.4." and stores in the storage device 1600 the outgoing file 6210 having the obtained own terminal address "1.2.3.4." stored therein. Then in communication terminal 1000*a*, the document edit process portion 6100 activated by its own user displays on the display unit the contents of any document file 6110 as a document display screen 300, its own user pastes the icon 302 on the document display screen 300, and then terminates the document edit process. This causes the outgoing file 6210 stored in the storage device 1600 to be stored in the document file 6110, and then the document file 6110 to be stored in the storage device 1600. Subsequently, the communication terminal 1000*a* transmits the document file 6110 stored in the storage device 1600 to the mail server 2000 as an electronic mail directed to the user B.

In the communication terminal 1000*b*, when its own user B receives the electronic mail directed to the user B from the mail server 2000, the document edit process portion 6100 activated by its own user displays on the display unit the contents of the document file 6110 received as the electronic mail in the form of the document display screen 300. When the document file 6110 does not contain the outgoing file

6210, the icon 302 is pasted on the document display screen 300, by which the user can understand to be asked the reply communication.

In response to it, when the user B clicks the mouse on the icon 302, the automatic outgoing start process is activated as associated with any outgoing file 6210 included in the document file 6110, so that the outgoing process is activated and the communication terminal 1000b performs the reply communication to the communication terminal 1000a corresponding to the party terminal address (that is, its own terminal address of the communication terminal 1000a) "1.2.3.4." stored in the outgoing file 6210.

At this time, the "Incoming" display screen 700 appears on the display unit in the communication terminal 1000a, while the "Calling" display screen 400 appears on the display unit in the communication terminal 1000b.

When the user A enters a connection instruction of accepting the incoming signal in the "Incoming" display screen 700, a communication channel is established between the communication terminals 1000a and 1000b and communication between the users A and B is enabled.

At this time, the "Talking" display screen 800 appears on the display unit in the communication terminals 1000a and 1000b.

The communication terminal 1000 may receive a plurality of electronic mails directed to its own user and display a mailing list including the electronic mails on the display unit.

As has been explained above, in the communication system of the eleventh embodiment, when the user of the communication terminal 1000 transmits the outgoing file 6210 and the document file 6110 as electronic mails directed to the desired party user, the sender user can ask the receiver user the reply communication and at the same time transmit a document message thereto.

Although the communication system of the eleventh embodiment has been arranged in the above case to transmit the outgoing file 6210 and the document file 6110 as electronic mails directed to the party user, the communication system may be arranged to transmit the outgoing file 6210 and document file 6110 associated therewith in the form of a single electronic mail directed to the party user.

In the communication systems of all the foregoing embodiments, information to be transmitted on the communication channel established between the communication terminals of the both users can include, for example, users' voice, users' images, video and voice reproduced by VTRs, and still images captured by image scanners. In other words, the type of the information to be transferred on the communication channel will not affect the communication system of the present invention.

Further, two or more of the communication systems of all the foregoing embodiments may be used as combined.

For example, the communication system of the embodiment utilizing the certification information may be combined with the communication system of the embodiment utilizing the response limit. The communication system of the embodiment using the password as the certification information may be used as combined with the communication system of the embodiment using the user ID as the certification information to use both the password and user ID as the certification information. Further, the communication system of the embodiment using the user ID at the time of the reply communication may be used as combined with the communication system of the embodiment using the user ID at the time of receiving the incoming signal based on the reply communication.

In the communication systems of all the foregoing embodiments, though the icon 302 has been displayed on the display unit for the purpose of prompting the user asked reply communication by the originator user to enter an instruction of performing the reply communication, the present invention is not limited to the specific example but the icon may have any desired display format such as the party terminal address per se or a mark represented by letters meaning the reply communication.

As has been explained in the foregoing, in accordance with the communication system of the present invention, even when the user of the communication terminal does not know the terminal address of the communication terminal of the desired party user, a communication channel can be established between the communication terminals of the both users to thereby establish communication between the both users, while eliminating the need for providing the monitor server conventionally used in the aforementioned known art.

What is claimed is:

1. A communication system including a plurality of communication terminals and a mail server for storing therein electronic mails transferred between said plurality of communication terminals, each of said plurality of communication terminals comprising:

electronic mail means for transmitting electronic mail directed to a user of an unknown communication terminal address to said mail server and for receiving self-addressed electronic mail from said mail server;

outgoing file preparation means for preparing an outgoing file including a terminal address uniquely allocated to the respective communication terminal;

outgoing file transmission means for transmitting the outgoing file prepared by said outgoing file preparation means to said electronic mail means as the electronic mail directed to a party user at the unknown communication terminal address with whom communication is desired;

reply communication acceptance/non-acceptance means for accepting an instruction of whether the respective communication terminal replies to the communication terminal corresponding to the terminal address included in the outgoing file when the electronic mail received by said electronic mail means is the outgoing file;

reply communication means for replying to the communication terminal corresponding to the terminal address included in the outgoing file received by said electronic mail means as the electronic mail when said reply communication acceptance/non-acceptance means accepts an instruction for replying, wherein said outgoing file preparation means prepares the outgoing file which further includes certification information for certifying the user of the respective communication terminal, and said reply communication means, when replying to the communication terminal corresponding to the terminal address included in the outgoing file received as the electronic mail by said electronic mail means, sends the certification information included in the outgoing file to the destination communication terminal;

selective response means for accepting the incoming signal from the other communication terminal and the certification information at the same time when said certification information is the correct certification information;

certification information memory means for storing therein the certification information for certifying the user of the respective communication terminal, wherein said outgoing file preparation means prepares the outgoing file which further includes the certification information stored in said certification information memory means, said selective response means judges that the received certification information is the correct certification information when the certification information received from the other communication terminal at the same time as the incoming signal coincides with the certification information stored in said certification information memory means, and said certification information memory means stores therein the certification information accepted by said certification information acceptance means; and certification information acceptance means for accepting an input of the certification information for certifying the user of the respective communication terminal, wherein said outgoing file preparation means prepares the outgoing file which further includes the certification information accepted by said certification information acceptance means, said certification information acceptance means accepts the input of the certification information for certifying its own user when receiving the incoming signal from the other communication terminal at the same time as the certification information, said selective response means judges that the received certification information is the correct certification information when the certification information received from the other communication terminal at the same time as the incoming signal coincides with the certification information accepted by said certification information acceptance means, said certification information is the user ID of the user of the respective communication terminal utilized as the address of the self-addressed electronic mail, and said reply communication acceptance/non-acceptance means causes the user ID contained in the outgoing file received as the electronic mail by said electronic mail means to appear on a display screen and also causes an icon to appear on the display screen to prompt the user of the respective communication terminal to enter an instruction for replying to the communication terminal of the user corresponding to the user ID.

2. A communication system as set forth in claim 1, wherein each of said plurality of communication terminals further comprises user ID memory means for storing therein user IDs corresponding to a plurality of users, said reply communication acceptance/non-acceptance means performs no operation when the user ID included in the outgoing file received as the electronic mail by said electronic mail means is stored in said user ID memory means, and said reply communication means replies to the communication terminal corresponding to the terminal address included in the outgoing file when the user ID included in the outgoing file received as electronic mail by said electronic mail means is stored in said user ID memory means.

3. A communication system including a plurality of communication terminals and a mail server for storing therein electronic mails transferred between said plurality of communication terminals, each of said plurality of communication terminals comprising:

electronic mail means for transmitting electronic mail directed to a user of an unknown communication terminal address to said mail server and for receiving self-addressed electronic mail from said mail server;

outgoing file preparation means for preparing an outgoing file including a terminal address uniquely allocated to the respective communication terminal;

outgoing file transmission means for transmitting the outgoing file prepared by said outgoing file preparation means to said electronic mail means as the electronic mail directed to a party user at the unknown communication terminal address with whom communication is desired;

reply communication acceptance/non-acceptance means for accepting an instruction of whether the respective communication terminal replies to the communication terminal corresponding to the terminal address included in the outgoing file when the electronic mail received by said electronic mail means is the outgoing file;

reply communication means for replying to the communication terminal corresponding to the terminal address included in the outgoing file received by said electronic mail means as the electronic mail when said reply communication acceptance/non-acceptance means accepts an instruction for replying, wherein said outgoing file preparation means prepares the outgoing file which further includes certification information for certifying the user of the respective communication terminal, and said reply communication means, when replying to the communication terminal corresponding to the terminal address included in the outgoing file received as the electronic mail by said electronic mail means, sends the certification information included in the outgoing file to the destination communication terminal;

selective response means for accepting the incoming signal from the other communication terminal and the certification information at the same time when said certification information is the correct certification information;

certification information memory means for storing therein the certification information for certifying the user of the respective communication terminal, wherein said outgoing file preparation means prepares the outgoing file which further includes the certification information stored in said certification information memory means, said selective response means judges that the received certification information is the correct certification information when the certification information received from the other communication terminal at the same time as the incoming signal coincides with the certification information stored in said certification information memory means, and said certification information memory means stores therein the certification information accepted by said certification information acceptance means; and certification information acceptance means for accepting an input of the certification information for certifying the user of the respective communication terminal, wherein said outgoing file preparation means prepares the outgoing file which further includes the certification information accepted by said certification information acceptance means, said certification information acceptance means accepts the input of the certification information for certifying its own user when receiving the incoming signal from the other communication terminal at the same time as the certification information, said selective response means judges that the received certification information is the correct certification information when the certification information received from the other communication terminal at the same time as the incoming signal coincides with the certification information accepted by said certification information acceptance means, and said reply communication acceptance/non-acceptance means causes the terminal address included in the outgoing file received as electronic mail by said electronic mail means to appear on the display screen and also causes an icon to appear on the display screen to prompt the user of the respective communication terminal to enter an instruction for replying to the communication terminal corresponding to the terminal address.

4. A communication system as set forth in claim 3, wherein each of said plurality of communication terminals further comprises user information memory means for storing therein user information on each of a plurality of user IDS associated with user information including user names, and said reply communication acceptance/non-acceptance means causes the user information to appear on the display screen when the user information corresponding to the user ID displayed on the display screen is stored in said user information memory means.

* * * * *